US009191582B1

(12) United States Patent
Wright et al.

(10) Patent No.: US 9,191,582 B1
(45) Date of Patent: Nov. 17, 2015

(54) MULTI-MODE HIGH SPEED SENSOR

(75) Inventors: Harold T. Wright, Pelham, NH (US); James A. Stobie, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 660 days.

(21) Appl. No.: 13/460,183

(22) Filed: Apr. 30, 2012

Related U.S. Application Data

(60) Provisional application No. 61/481,090, filed on Apr. 29, 2011, provisional application No. 61/480,899, filed on Apr. 29, 2011, provisional application No. 61/481,108, filed on Apr. 29, 2011, provisional application No. 61/481,101, filed on Apr. 29, 2011.

(51) Int. Cl.
*G01J 5/10* (2006.01)
*G01J 5/20* (2006.01)
*H04N 5/33* (2006.01)

(52) U.S. Cl.
CPC ... *H04N 5/33* (2013.01); *G01J 5/10* (2013.01); *G01J 5/20* (2013.01)

(58) Field of Classification Search
USPC .......................................................... 250/349
See application file for complete search history.

(56) References Cited

U.S. PATENT DOCUMENTS 4,728,803 A * 3/1988 Catchpole et al. ............ 358/465
5,343,555 A 8/1994 Yayla et al.
5,572,257 A * 11/1996 Conrads et al. ............... 348/308
5,751,189 A 5/1998 Shyu et al.
6,366,320 B1 * 4/2002 Nair et al. ..................... 348/300
6,741,341 B2 5/2004 DeFlumere
6,864,965 B2 3/2005 DeFlumere
6,929,214 B2 8/2005 Ackleson et al.
7,135,672 B2 11/2006 Land
7,642,766 B2 1/2010 Masson et al.
7,859,581 B2 * 12/2010 Guidash ........................ 348/302
8,049,869 B2 11/2011 Flowers et al.
8,102,426 B2 1/2012 Yahav et al.
8,547,170 B1 10/2013 Stobie et al.
2004/0004707 A1 * 1/2004 DeFlumere .................. 356/4.01
2008/0013686 A1 * 1/2008 Kameshima et al. ........... 378/98
2009/0072120 A1 * 3/2009 McGarry et al. ........... 250/208.1
2009/0244521 A1 10/2009 Yazdanfar et al.

OTHER PUBLICATIONS

Directional Infrared Counter Measures, http://en.wikipedia.org/wiki/Directional Infrared Counter Measures 2 pages, printed from Internet on Apr. 4, 2012.

(Continued)

*Primary Examiner* — Christine Sung
(74) *Attorney, Agent, or Firm* — Finch & Maloney PLLC; Neil F. Maloney

(57) ABSTRACT

Techniques are disclosed that provide a multi-mode sensor having the capability to support both passive and active operation. One embodiment provides a sensor readout device for operation with a sensor array having rows and columns of detectors. The device includes a column cell for receiving a detector output signal from a first row of a column of the sensor array, and an additional column cell. The device further includes a multiplexer configured to steer a detector output signal from a second row of the column of the sensor array to the additional column cell, thereby allowing multiple rows of the sensor array to be readout simultaneously. In some cases, the sensor array includes an active/passive dual mode central windowed area, and the multiplexer allows columns of the windowed area to be readout at two or more speeds.

20 Claims, 16 Drawing Sheets

Digital MUX (e.g., Nx4:1, X-bit)
Column Cells (e.g., Nx4) Parallel ADC and X-bit Latches
Analog Fan-out MUX (e.g., Mode1=1:4; Mode2=1:8)
Output Driver
Serial Digital Output
Input Cell Array
Command Word
Master Clock
Command Decoder
Passive/Active Mode Zone (e.g., M'xN')
Passive Mode Zone (e.g., MxN)
Analog Fan-out MUX (e.g., Mode1=1:4; Mode2=1:8)
Column Cells (e.g., Nx4) Parallel ADC and X-bit Latches
Digital MUX (e.g., Nx4:1, X-bit)
Output Driver
Serial Digital Output

(56) References Cited

OTHER PUBLICATIONS

AN/AAQ-24 Directional Infrared Countermeasures (DIRCM) 2 pages, http://www.globalsecurity.org/military/systems/aircraft/systems/an-aaq-24.htm, printed from Internet Apr. 4, 2012.

Office Action received for U.S. Appl. No. 13/460,155, mailed on Feb. 18, 2014, 13 pages.

Office Action received for U.S. Appl. No. 13/460,155, mailed on Jul. 7, 2014, 12 pages.

* cited by examiner

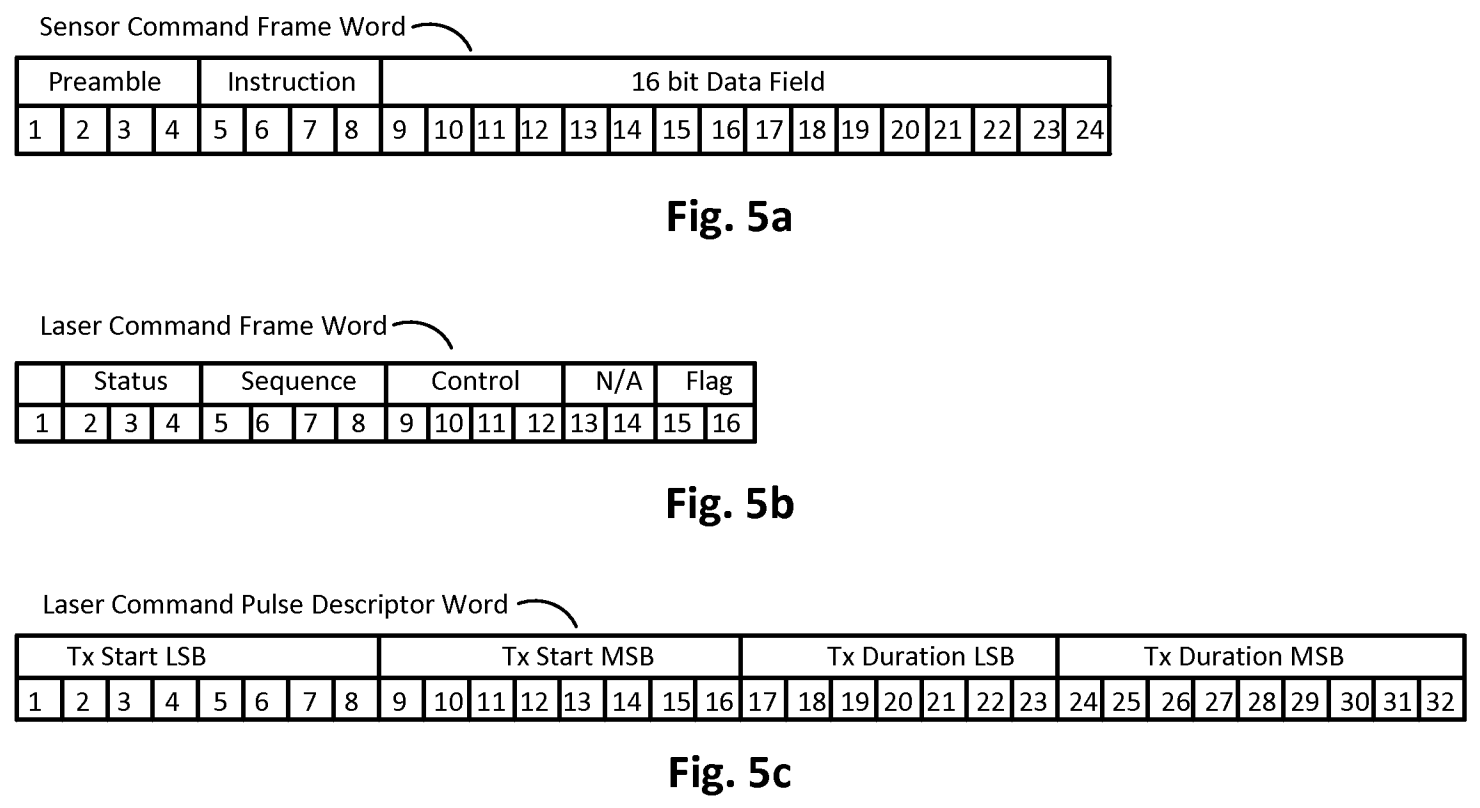

Sensor Command Frame Word

| Preamble | | | | Instruction | | | | 16 bit Data Field | | | | | | | | | | | | | | | |
|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Fig. 5a

Laser Command Frame Word

| | Status | | | Sequence | | | | Control | | | | N/A | | Flag | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |

Fig. 5b

Laser Command Pulse Descriptor Word

| Tx Start LSB | | | | | | | | Tx Start MSB | | | | | | | | Tx Duration LSB | | | | | | | | Tx Duration MSB | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |

Fig. 5c

Fig. 7a
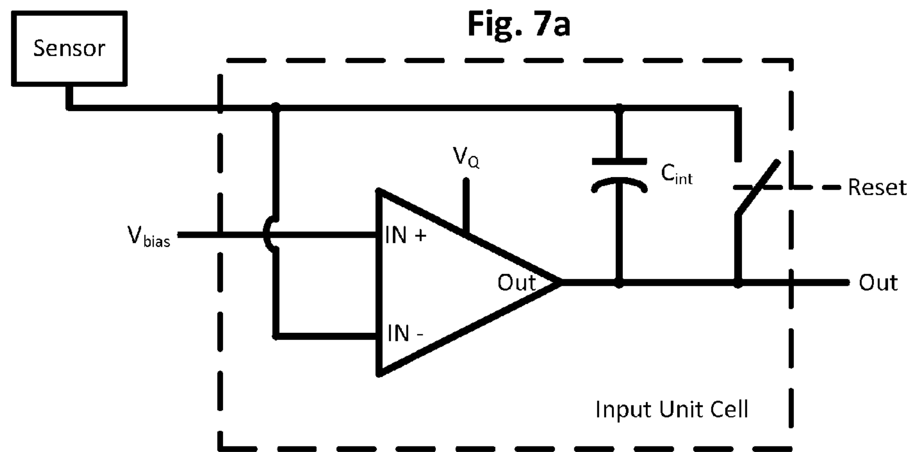
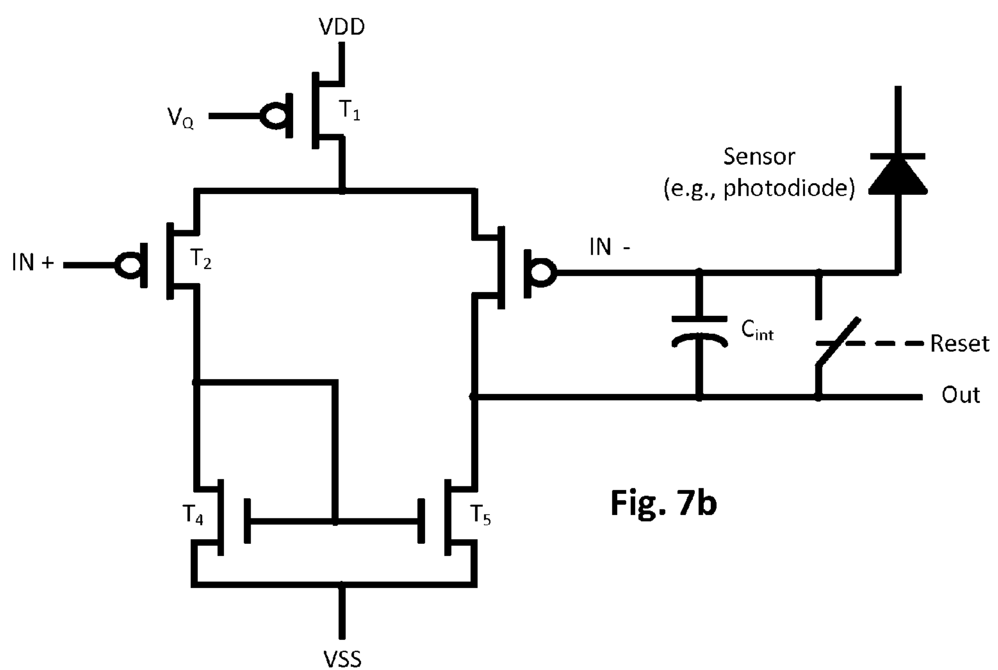
Fig. 7b

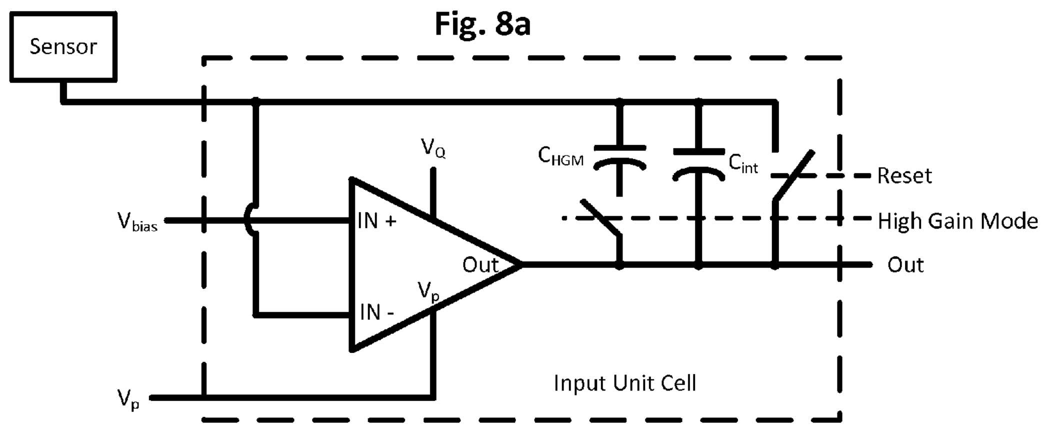
Fig. 8a
Sensor
$V_Q$
$C_{HGM}$
$C_{int}$
Reset
High Gain Mode
$V_{bias}$
IN +
Out
$V_p$
IN -
Out
$V_p$
Input Unit Cell
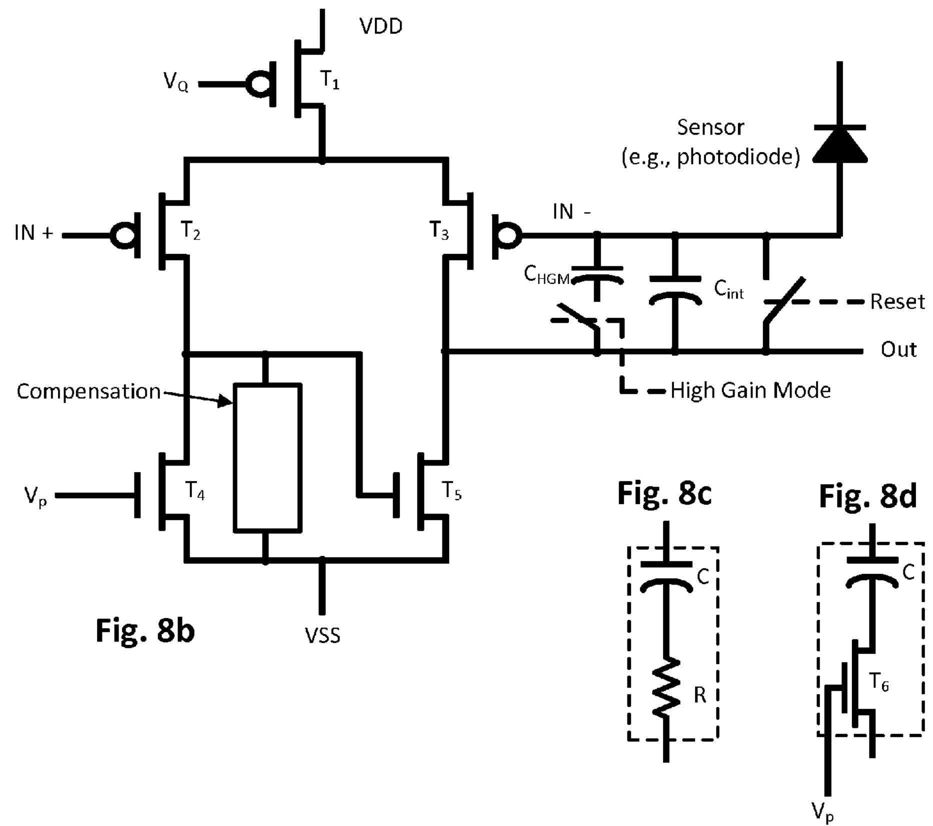
VDD
$V_Q$
$T_1$
Sensor
(e.g., photodiode)
IN +
$T_2$
$T_3$
IN -
$C_{HGM}$
$C_{int}$
Reset
Out
High Gain Mode
Compensation
$V_p$
$T_4$
$T_5$
Fig. 8c
Fig. 8d
C
C
R
$T_6$
Fig. 8b
VSS
$V_p$

MULTI-MODE HIGH SPEED SENSOR

RELATED APPLICATIONS

This application claims the benefit of and priority to U.S. Provisional Application Nos. 61/481,090, 61/480,899, 61/481,108, and 61/481,101, each filed on Apr. 29, 2011, and each of which is herein incorporated by reference in its entirety. In addition, this application is related to U.S. application Ser. No. 13/460,118 (now U.S. Pat. No. 8,885,152) titled "Synchronized Countermeasure System Architecture", and Ser. No. 13/460,155 (now U.S. Pat. No. 8,934,087) titled "Multi-Zone Approach for Active/Passive Sensing", each of which was filed on Apr. 30, 2012 and is herein incorporated by reference in its entirety.

FIELD OF THE DISCLOSURE

The invention relates to sensor technology, and more particularly, to a multi-mode sensor having the capability to support passive and active operation.

BACKGROUND

There is an ongoing need for light weight, low cost, efficient directed infrared countermeasure (DIRCM) systems to address missile threats. However, there are numerous non-trivial issues associated with such systems.

SUMMARY

One embodiment of the present invention provides a sensor readout device for operation with a sensor array having rows and columns of detectors. The device includes a column cell for receiving a detector output signal from a first row of a column of the sensor array, and an additional column cell. The device further includes a multiplexer configured to steer a detector output signal from a second row of the column of the sensor array to the additional column cell, thereby allowing multiple rows of the sensor array to be readout simultaneously. In some cases, the multiplexer is an analog multiplexer that receives analog detector signals from the sensor array. In some cases, each of the column cell and the additional column cell is configured with an analog-to-digital converter for converting an analog detector signal to a digital signal and an amplifier circuit for amplifying the analog detector signal. In some cases, column cells associated with an active/passive dual mode zone of the sensor array comprise an amplifier circuit having multiple gain modes. In some cases, the device further includes the sensor array. In some such case, the sensor array includes an active/passive dual mode central windowed area. In some cases, the sensor array includes M×N pixels, and all available M×N pixels are used for detecting a target during a passive mode, and a subset of the available M×N pixels is used for detecting during the passive mode and an active mode, and column cells associated with the subset of the available M×N pixels are configured differently than the other available column cells (e.g., to allow increased frame rate for rapid refresh). In some cases, the sensor array includes M×N pixels, and all available M×N pixels are used for detecting a target during a passive mode, and a subset of the available M×N pixels is used for detecting during the passive mode and an active mode, and the multiplexer allows columns of the subset to be readout at two or more speeds. In some such cases, the two or more speeds include a normal speed which is used during the passive mode and a higher speed which is used during the active mode. In one such specific case, the normal speed can also be used during the active mode and/or the higher speed can be used during the passive mode. In some cases, the sensor array is divided into portions, and each portion is serviced by a multiplexer configured to steer detector output signals from rows of given column of that sensor array portion to additional column cells dedicated to that sensor array portion. In some cases, the device further includes a command decoder configured to provide timing control including at least one of start and end of integration time independent of sensor frame period, multiple integrations within a frame period, and multiple blanking intervals within a frame period. In some cases, the device further includes a command decoder configured to support seamless transitions between modes of operation including at least one: active/passive detecting modes; wide/narrow field of view modes; and normal/fast readout speed modes. In one such case, the command decoder is further configured to provide power management optimization for the modes of operation. In some cases, the device has a plurality of column cells, and further includes a multiplexer for multiplexing output of the column cells into a serial data stream, and an output driver for driving the serial data stream. Numerous variations will be apparent in light of this disclosure. For example, another embodiment provides a sensor system comprising the device as variously defined in this paragraph. Another embodiment provides a system-on-chip comprising the sensor system.

Another embodiment of the present invention provides a sensor readout system. The device includes a sensor array having rows and columns of detectors for providing analog detector signals, wherein the sensor array includes M×N pixels and all available M×N pixels are used for detecting a target during a passive mode, and a subset of the available M×N pixels is used for detecting during the passive mode and an active mode. The system further includes a column cell for receiving a detector output signal from a first row of a column of the sensor array, and an additional column cell. The device further includes a multiplexer configured to steer a detector output signal from a second row of the column of the sensor array to the additional column cell, thereby allowing multiple rows of the sensor array to be readout simultaneously, and wherein the multiplexer allows columns of the subset to be readout at two or more speeds. In one such case, column cells associated with the subset of the available M×N pixels are configured differently than the other available column cells (e.g., different gain, or multiple gain modes, and/or to allow for faster refresh rates).

Another embodiment of the present invention provides a sensor readout system. The system includes a sensor array having rows and columns of detectors for providing analog detector signals, wherein the sensor array includes M×N pixels, and all available M×N pixels are used for detecting a target during a passive mode, and a subset of the available M×N pixels is used for detecting during the passive mode and an active mode, and wherein the sensor array is divided into multiple portions. The system further includes a first column cell for receiving a detector output signal from a first row of a first column in a first portion of the sensor array, and a first additional column cell. The system further includes a first multiplexer configured to steer a detector output signal from a second row of the first column to the first additional column cell. The system further includes a second column cell for receiving a detector output signal from a first row of a second column in a second portion of the sensor array, and a second additional column cell. The system further includes a second multiplexer configured to steer a detector output signal from a second row of the second column to the second additional column cell. The system further includes a third multiplexer for multiplexing output of column cells associated with the first portion into a first serial data stream, and a first output driver for driving the first serial data stream. The system further includes a fourth multiplexer for multiplexing output of column cells associated with the second portion into a second serial data stream, and a second output driver for driving the second serial data stream. At least one of the first and second multiplexers allows columns of the subset to be readout at two or more speeds.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3*k* is provides a range domain view point for acquisition while

FIG. 5*a* illustrates an example sensor command frame word, configured in accordance with an embodiment of the present invention.

FIG. 5*b* illustrates an example laser command frame word, and FIG. 5*c* illustrates an example laser command pulse descriptor word, each configured in accordance with an embodiment of the present invention.

FIGS. 7*a* and 7*b* each illustrates a schematic of an integrating differential amplifier that can be used in the input unit cell of the sensor circuit of FIG. 4*a*, configured in accordance with an embodiment of the present invention.

FIGS. 8*a* and 8*b* each illustrates a schematic of an integrating differential amplifier that can be used in the input unit cell of the sensor circuit of FIG. 4*a*, configured in accordance with another embodiment of the present invention.

FIGS. 8*c* and 8*d* each illustrate an example optional compensation circuit that can be used the amplifier of FIGS. 8*a-b*, configured in accordance with another embodiment of the present invention.

Figure 1:
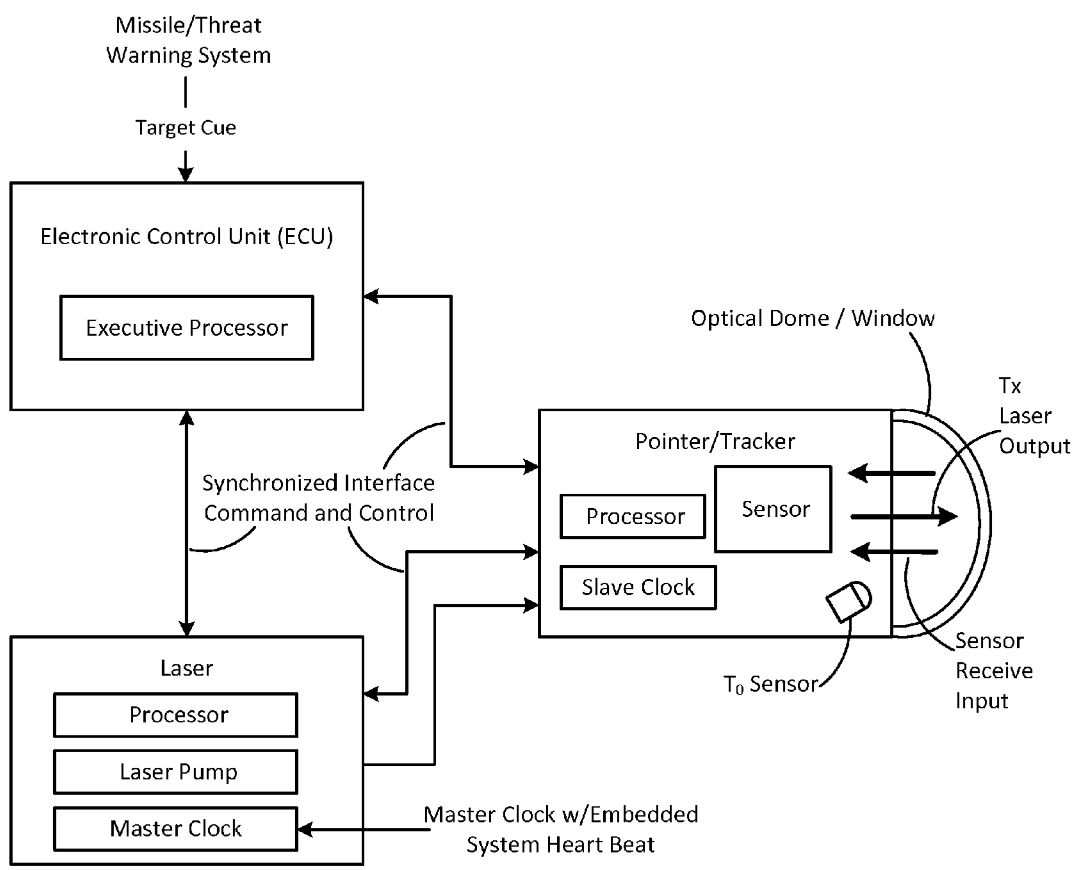
FIG. 1 illustrates a block diagram of an example countermeasure system configured with a synchronized interface for command and control between the system's sensor and the laser, in accordance with an embodiment of the present invention.

As will be appreciated, the figures are not necessarily drawn to scale but rather are presented to assist in understanding of the various example embodiments of the present invention. For instance, durations of time depicted in the various timing diagrams may be depicted as being longer than they actually are, so that events occurring within that duration can be depicted with better clarity.

DETAILED DESCRIPTION

Techniques are disclosed that provide a multi-mode sensor having the capability to support both passive and active operation. In one example embodiment, the radiation being sensed is infrared (IR), although numerous other wavelength ranges of interest can be sensed in accordance with an embodiment of the present invention. Applications for such a sensor include next generation DIRCM systems, as well as any sensing or imaging systems that can benefit from have the capability to support multiple modes of operation (e.g., passive and active radiation detection). The passive operating mode involves observing a target based on radiation emanated from the target itself, and allows for azimuth and elevation information of the target to be learned. The active operating mode involves directing a laser or other radiation to the target and observing a portion of that radiation that is reflected back from the target. This active mode allows for azimuth and elevation (x-axis and y-axis) information of the target to be learned, as well as distance (z-axis) information, so as to provide a three dimensional view of the target.

General Overview

Next generation DIRCM systems are associated with a number of demands and performance criteria that are difficult to meet using conventional technology. However, a multi-mode infrared sensor configured in accordance with an embodiment of the present invention such that the sensor has the capability to support passive and active IR operation, enables such demands and performance criteria to be met. In one specific such embodiment, the multi-mode capability of the sensor is built into a digital read-out-integrated circuit (ROIC), which is bump-bonded or otherwise integrally coupled with the sensor detection array so as to provide a system-on-chip.

The multi-mode sensor chip or assembly (including the sensor portion and the readout portion) can be configured with the following capabilities or any subset thereof, in accordance with some example embodiments of the present invention:

1) High-Speed Sensor Full FOV digital data readout;

2) Very High-Speed Windowed FOV digital data readout;

3) Real-time programmability for long to very short integration times independent of sensor frame start time (integration time can be positioned anywhere in time within the sensor's frame period);

4) Overlap Integration time and data readout (Read while Integrate);

5) Time Delay Integration (TDI) active mode operation;

6) Seamless switching between full FOV and Windowed FOV and normal and high-speed modes;

7) Menu driven operation mode;

8) Power management; and

9) High-Speed Synchronized Serial Command and Control Interface.

The sensor portion can be implemented, for example, using any number of sensor technologies. In one example embodiment, the sensor portion is implemented with an FPA, such as a HgCdTe 30 micron pitch FPA. As will further be appreciated in light of this disclosure, the sensor materials, pitch, resolution (pixels), and other features will be dependent on particulars of the given application, such as the wavelength range of interest, radiation intensity, image resolution and quality, desired modes of operation, and available image processing power. The claimed invention is not intended to be limited to any particular sensor configuration.

In some embodiments, the multi-mode techniques are employed in a countermeasure system, such as a directed infrared countermeasure (DIRCM) system, that is structured into an operational sequence suitable for a missile countermeasure engagement. The operational sequence is based on a Master Frame (System Heart Beat) at, for example, 500 Hz or 2 msec made up of passive and active sub-frames. In one such specific example case, the passive subframe varies anywhere from, for instance, 5 μsec to 1 msec, leaving the remaining time within the Master Frame for the active ranging of the target. The precise timing facilitates both coarse and fine resolution ranging. High accuracy is enabled with a synchronized interface from the initialization of the commands to the laser and the sensor to start the time increment counting or ranging to the target, in accordance with an embodiment of the present invention.

The synchronized DIRCM architecture configured in accordance with one such embodiment utilizes the previous Master Frame period to send the laser commands for the next operating period, all synchronized to the master clock. In some such embodiments, to eliminate any jitter and latency variations between the command and actual firing of the laser, a time zero ($T_0$) sensor is provided to measure the time at which the actual laser pulse leaves the DIRCM system, and it is this laser departure time the sensor of the system's receiver uses as reference to set the frame start and timing measurements. In one such specific case, the synchronized interface for the laser and sensor utilizes one or more command word structures to describe the operating parameters for the next Master Frame sequence. Numerous variations on this command and control protocol will be apparent in light of this disclosure.

Thus, a system interface architecture configured in accordance with one example embodiment of the present invention includes the following three elements:

1) a high-speed interface with laser and sensor command control words synchronized with the master clock and an embedded System Heart Beat for every Master Frame period;

2) a laser and sensor command and control protocol within the Master Frame period; and 3) a $T_0$ sensor so that the time measurement can be incorporated into the timing interface.

System Architecture

FIG. 1 illustrates a block diagram of a DIRCM system configured with a synchronized interface for command and control between the system's sensor and the laser, in accordance with an embodiment of the present invention. As can be seen, the system generally includes an electronic control unit (ECU) sub-assembly, a pointer/tracker sub-assembly, and a laser sub-assembly. A synchronized interface for command and control between the system's pointer/tracker and laser allows for communication between these sub-assemblies.

The ECU of the system includes an executive processor, which generally directs functionality of the system, and operates in conjunction with the laser sub-assembly processor and the pointer/tracker sub-assembly processor to carryout countermeasure functionality as conventionally done. In addition, the three sub-assembly processors (or a subset thereof) are further configured to execute the synchronized interface as described herein.

In this example embodiment, the laser sub-assembly includes a processor and laser pump, and is further configured to generate a master clock signal which has embedded therein a System Heart Beat. The pointer/tracker sub-assembly is configured to generate a slave clock and further includes a $T_0$ sensor to measure the time a laser pulse leaves the system, which the sensor of the pointer/tracker sub-assembly (e.g., camera with focal plane array and readout integrated circuit) uses as reference to set frame start and timing measurements. The laser output is guided to the incoming threat in effort to achieve threat negation. Note that in other embodiments, the various clocks can be generated in other locations, or by dedicated clock generation circuits that provide the desired clock signal to the corresponding circuitry. In addition, other circuitry not shown in the sub-assemblies of FIG. 1 will be apparent.

Figure 2A:
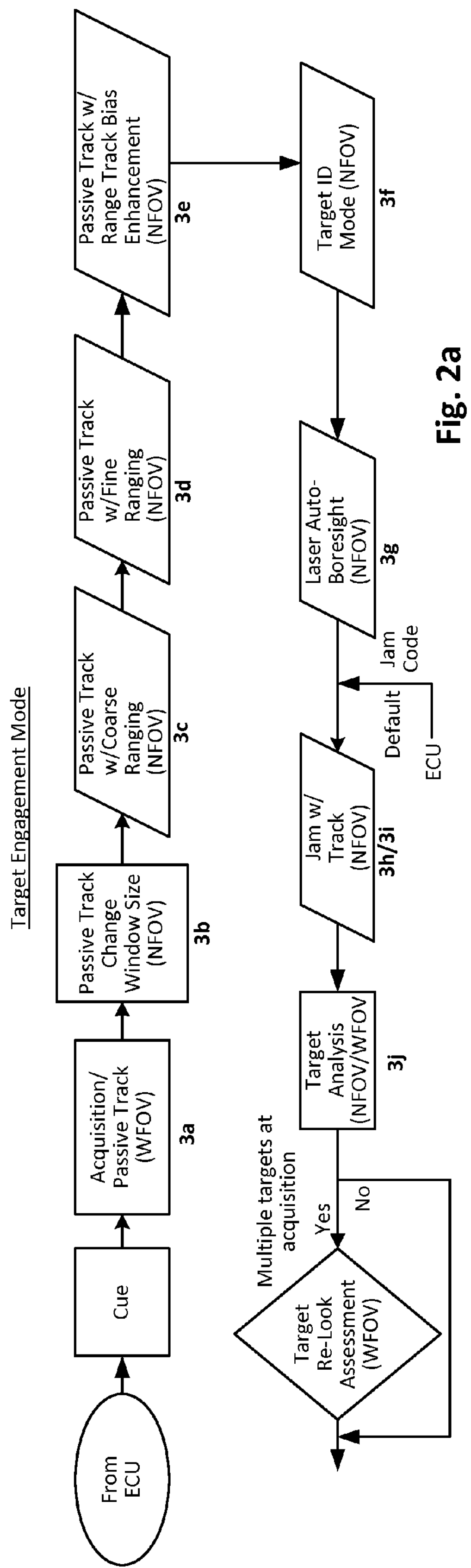
FIGS. 2*a* and 2*b* are flowcharts demonstrating example target engagement and situation awareness modes, respectively, that can be carried out by the countermeasure system of FIG. 1, in accordance with an embodiment of the present invention.
Figure 2B:
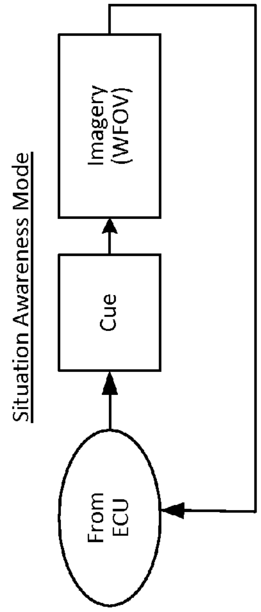

FIGS. 2*a* and 2*b* are flowcharts demonstrating example target engagement and situation awareness modes, respectively, that can be carried out by the countermeasure system of FIG. 1, in accordance with an embodiment of the present invention. The situation awareness mode can generally be carried out as conventionally done. The target engagement mode can be carried out in accordance with various embodiments of the present invention, and will be discussed with reference to FIGS. 3*a* through 3*l*, as designated in FIG. 2*b*.

As can be seen, the situation awareness mode involves providing sensor imagery to the ECU for area assessment by, for example, requesting personnel so that potential threats or targets can be assessed when appropriate (e.g., for reconnaissance missions to image enemy activity, or to image ground surface during landing when pilot visibility is impaired). In this mode, the sensor passively observes the area within its wide field of view (WFOV), which can be set as desired. In one example embodiment, the sensor of the pointer/tracker assembly includes a focal plane array (FPA) configured with a 256 by 256 array of pixels (or a sub-set thereof) that can be used in this passive observation/imaging mode. Further note that multiple such sensors can be deployed, so that a wider field of regard can be provided, up to 360°. With no perceived threat (or other target of interest), the ECU may, for example, be provided with a Cue signal from a system such as an operational command system, or any other system capable of issuing a directive to the DIRCM system) directing continued passive observation/imaging to the jam head, which generally includes the laser and pointer/tracker sub-assemblies shown in FIG. 1, as well as other components such as a gimbal for each sensor and various optics to filter and/or otherwise focus light of interest on that sensor.

Figure 3A:
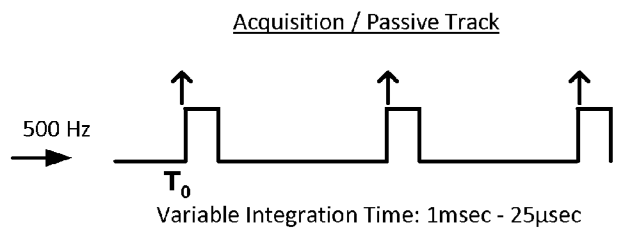
FIGS. 3*a*-3*j* illustrate timing diagrams that correspond to various activities carried out during the target engagement mode process flow shown in FIG. 2*a*, in accordance with an embodiment of the present invention FIGS. 3*k* and 3*l* each illustrates an example timing diagram showing part of a DIRCM sequence for passive track with ranging starting at the beginning, at short range first, in accordance with an embodiment of the present invention.
Figure 3B:
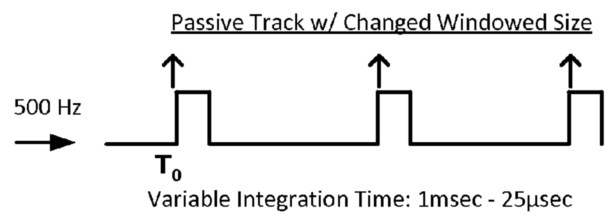
Figure 3C:
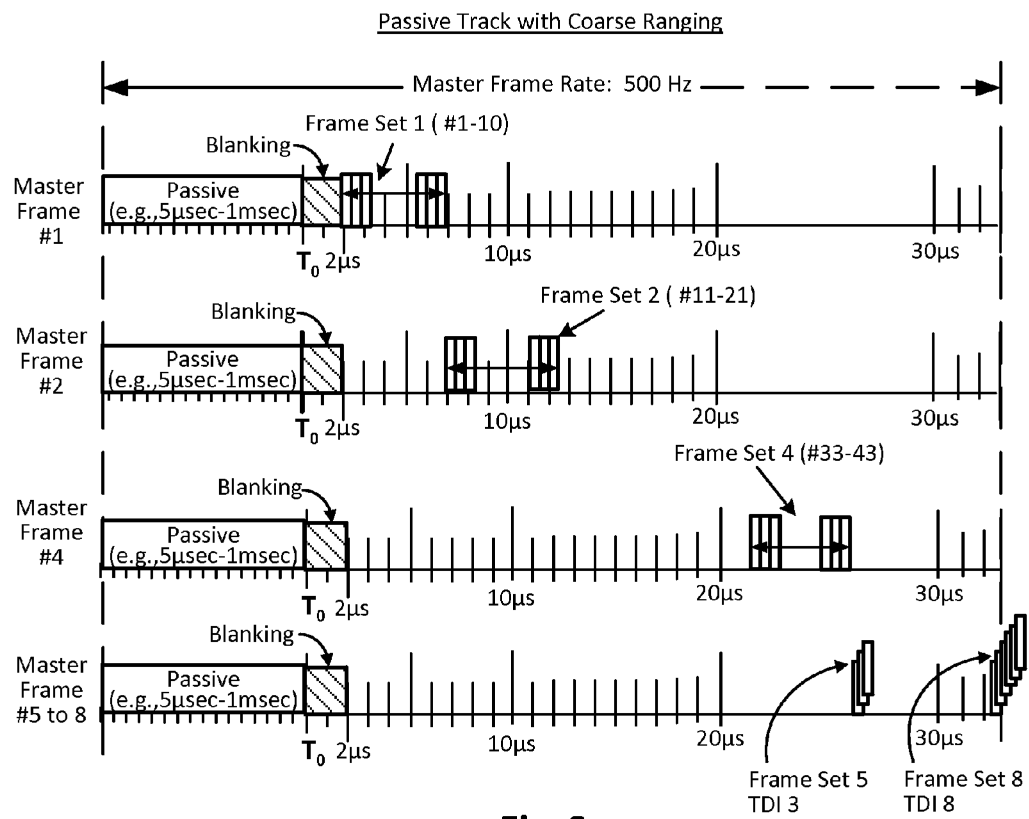
Figure 3D:
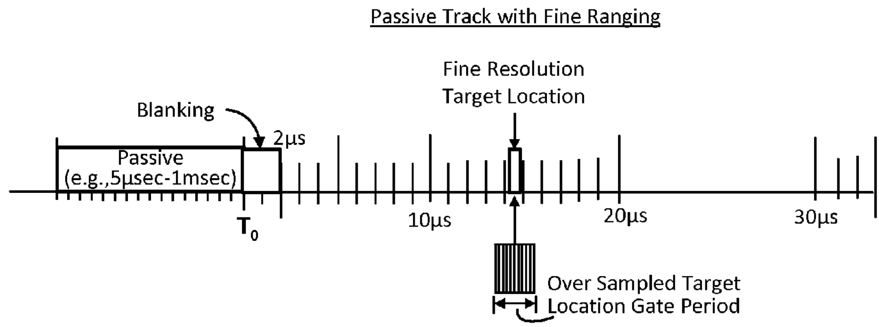

However, when the missile warning system declares a missile threat and sends a Cue to the DIRCM system, the target engagement mode shown in FIG. 2*a* is engaged. The Cue signal contains the inertial coordinates of the targeted threat. The pointer/tracker sub-assembly of the jam head receives the handoff cue from the DIRCM ECU, and rapidly slews the gimbal to the threat location somewhere in the jam head field of regard (FOR). FIG. 3*a* illustrates the passive tracking process in accordance with one example embodiment, where a Master Frame rate of 500 Hz and a variable integration time of 25 μsec to 1 msec are implemented (other embodiments can have other Master Frame rates and integration times, as will be appreciated in light of this disclosure). As can be further seen, note that the target can also actively be engaged with laser pings, and the time $T_0$ for each outgoing laser pulse (depicted by upward pointing arrow) can be measured for synchronization purposes.

With further reference to the example embodiment of FIG. 2*a*, the system passively tracks until the target/threat in range is acquired. As previously noted, the sensor of this example embodiment can be configured, for instance, with a 256 by 256 FPA that can be used in this passive tracking mode, but any number of suitable array configurations can be used as will be appreciated, including multi-zone or windowed sensor configurations. For instance, after target acquisition, the gimbal can be positioned and otherwise configured to center the target into a relatively small central window of the sensor for tracking, in accordance with one example embodiment of the present invention. In the example embodiment shown in FIG. 2*a*, the passive tracking window size is changed from the WFOV (e.g., the full 256 by 256 pixel array) to a narrow field of view (NFOV) (e.g., a centrally located 48 by 48 pixel sub-set of the pixel array). In some such cases, the track aim point is the laser boresight point. As can be seen in the example embodiment of FIG. 3*b*, the passive tracking process with the smaller central window of the sensor can be carried out at the same frame rate of 500 Hz and variable integration times of 25 μsec to 1 msec, and $T_0$ for each outgoing laser pulse can be measured for active tracking, in accordance with some example embodiments.

With further reference to the example embodiment of FIG. 2*a*, after passive track is re-established in the small window size (e.g., 48×48), active range sampling can be initiated to find the range of the target/threat (Passive Track w/Coarse Ranging). This process can be implemented in any number of ways as will be appreciated in light of this disclosure. In the specific example embodiment shown in FIG. 3*c*, while maintaining passive track by the passive integration in the beginning of each Master Frame (e.g., in the first 5 μsec to 1 msec of the Master Frame), a range sample 0.5 μsec is taken at a 0.5 μsec interval for each of ten sub-frames within one or more Master Frames (Master Frame #s 1 to 4, in this example) until the target is found. Note that a blanking interval is effectively achieved by the integration window only being initiated out in time away frame T0, which in this example case is 2 μsec from $T_0$. Other embodiments may have a different blanking period. The time delay integration (TDI) mode of Master Frame #s 5 to 8 will be further discussed in turn with reference to 11*a-b*.

With further reference to the example embodiment FIG. 2*a*, after Passive Track w/Coarse Ranging is completed and the range of the target is known, range sampling can be continued with fine resolution ranging to learn more about the target/threat (Passive Track w/Fine Ranging). This process can be implemented in any number of ways as will be appreciated in light of this disclosure. In general, fine resolution ranging is carried out by over sampling the target/threat, once the target/threat is located with coarse ranging. In some example embodiments, this higher or fine resolution ranging of the target is approximately 10 times greater than the coarse ranging resolution, as demonstrated in the example embodiment of FIG. 3*d*. As will be explained in turn, the sensor of the pointer/tracker sub-assembly can be configured to carry out hyper-clocking that enables the range gate to move sub-values of a range gate. Such fine resolution range gating will be further discussed in turn with reference to FIGS. 12*a-b*.

Thus, as will be appreciated in light of this disclosure, the jam head of the countermeasure system can be configured to implement a number of operational modes, including time delay integration (TDI), laser blanking, coarse resolution ranging, and fine resolution ranging. In some such embodiments, these modes can be implemented or otherwise directed by the sensor of the pointer/tracker sub-assembly. In one specific such example case, the sensor is implemented as a system-on-chip configuration having a sensor portion and readout integrated circuit (ROIC) portion, and the various functional modes are carried out by or otherwise directed by the ROIC. In some such cases, the sensor and ROIC portions can be operatively coupled to one another, for example, via an interconnect using any suitable hybridization process. The interconnect may be, for instance, indium bumps or other suitable interconnect material that can be used in the hybridization of the sensor and ROIC portion. In other example cases, the sensor portion can share the same substrate with the ROIC portion.

Figure 3E:
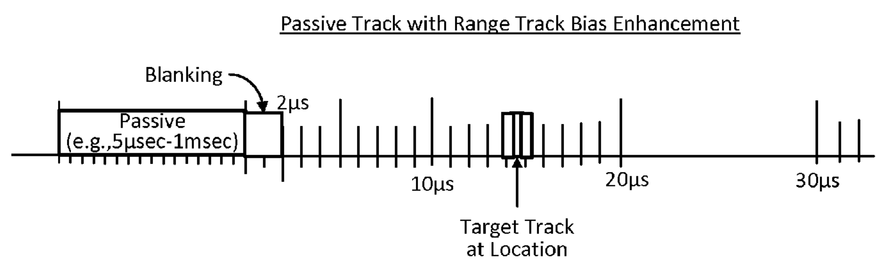
Figure 3F:
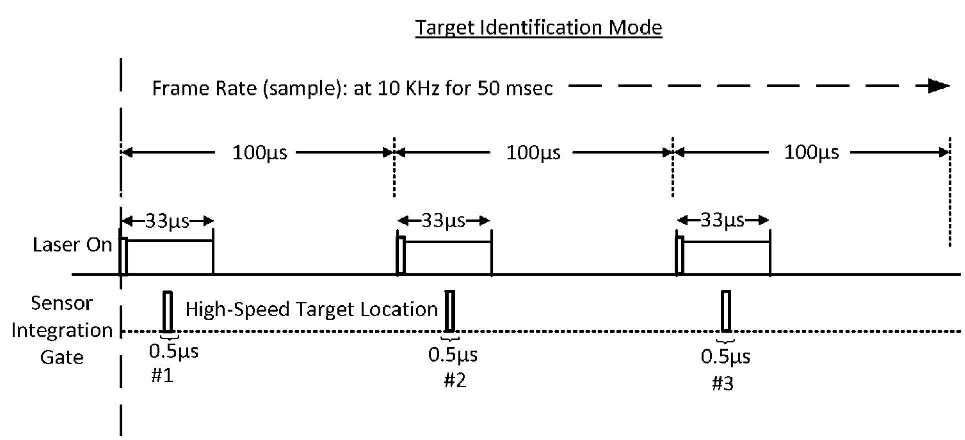

With further reference to the example embodiment of FIG. 2*a*, after the target range is determined with fine resolution ranging, note that the fine resolution range gate can be used to track the target/threat, as further demonstrated in FIG. 3*e* (Passive Track w/Range Track Bias Enhancement). In this sense, passive track can always be engaged with the active mode to reinforce or otherwise bolster knowledge of the target/threat in the azimuth and elevation planes.

Figure 3G:
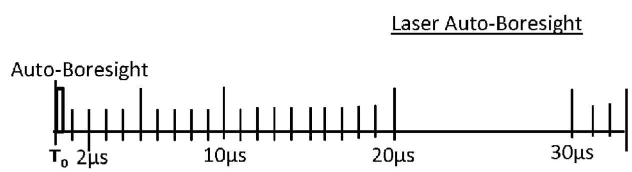
Figure 3H:
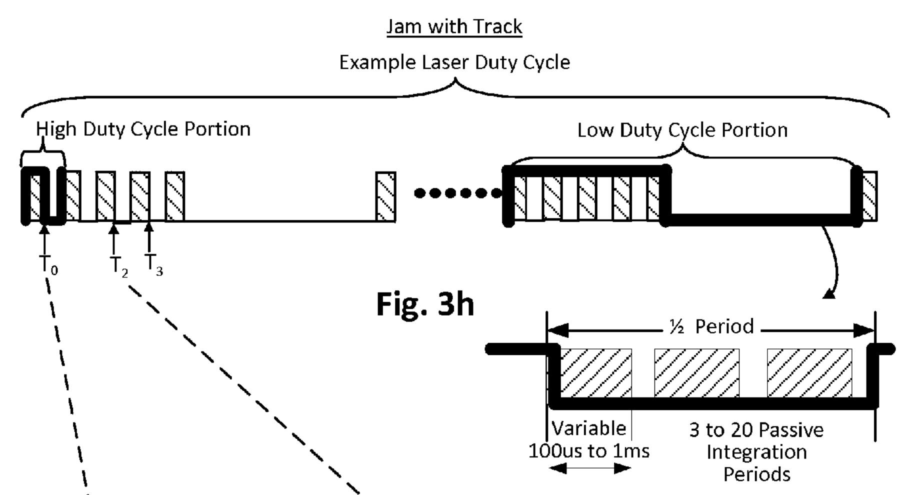
Figure 3I:
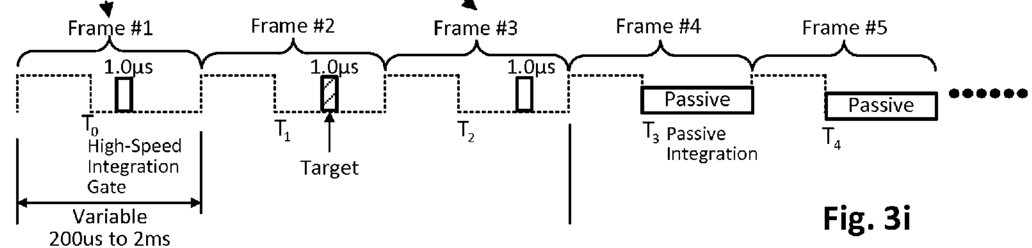

With further reference to the example embodiment FIG. 2*a*, after track is locked in, interrogation of the target can take place simultaneously with continuous active tracking (Target ID Mode). As can be seen, laser pulse sequences interact with the target and are captured by the range gates, as further demonstrated in FIG. 3*f*. As can be seen in this example embodiment, the frame rate is increased to 10 KHz for 50 msec during active track, and the sampling can be reduced, for example, to a three sample range gate around the target. For instance, a sample before and after the target/threat measured location can be provided, and changed accordingly as the target closes in range. The readout is capable of integrating multiple returns together in the input unit cell at a laser repetition rate of 33 μsec, in this example case shown in FIG. 3*c*, which in conjunction with a 100 μsec sub-frame allows for TDI-3 (three integration intervals per active sub-frame). With further reference to the example embodiment FIG. 2*a* (Laser Auto-Boresight) and as can be seen in FIG. 3*g*, auto-boresight mode is a calibration mode that can be used in some embodiments to account for laser pointing drift.

Figure 3J:
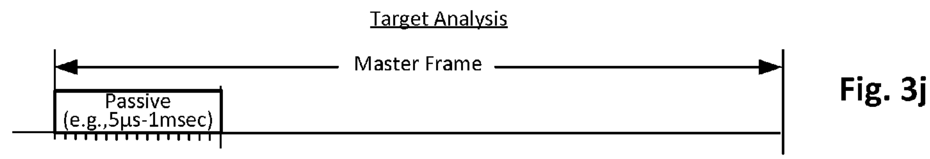

With further reference to the example embodiment FIG. 2*a*, the process flow may further include executing appropriate countermeasures such as jamming in conjunction with tracking (Jam w/Track). As can be seen in the corresponding FIGS. 3*h* and 3*i*, certain targets can be disrupted by a sequence of active pulses. As will be appreciated, proper sequences allow for passive/active tracking while disrupting the target/threat. With further reference to FIG. 2*a*, target analysis can be performed to assess the target/threat (Target Analysis), as further illustrated in FIG. 3*j*, which can be carried out in both wide and narrow fields of view. The example process flow of FIG. 2*a* further includes a target re-look mode (Target Re-Look Assessment), which may also be further illustrated as shown in FIG. 3*j*. In the example embodiment shown in FIG. 2*a*, this target re-look mode toggles back to a WFOV to acquire more targets of interest (e.g., such as other targets indicated in the Target CUE signal received by the ECU from the missile/threat warning system, as shown in FIG. 1).

Figure 3K:
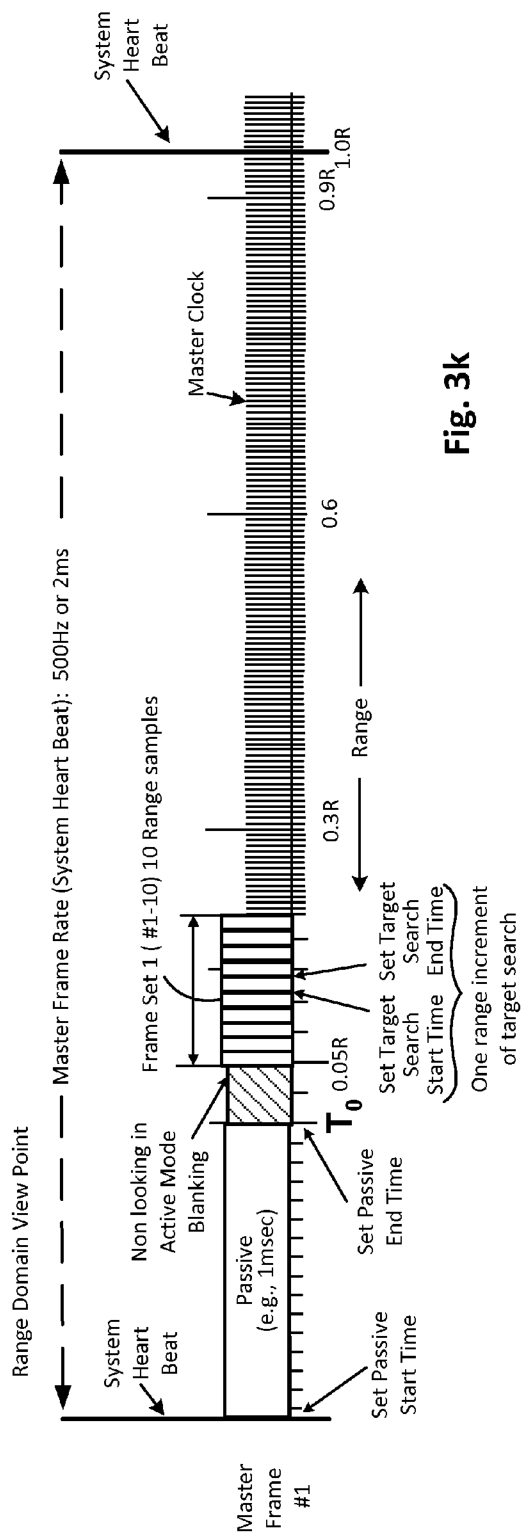
Figure 3L:
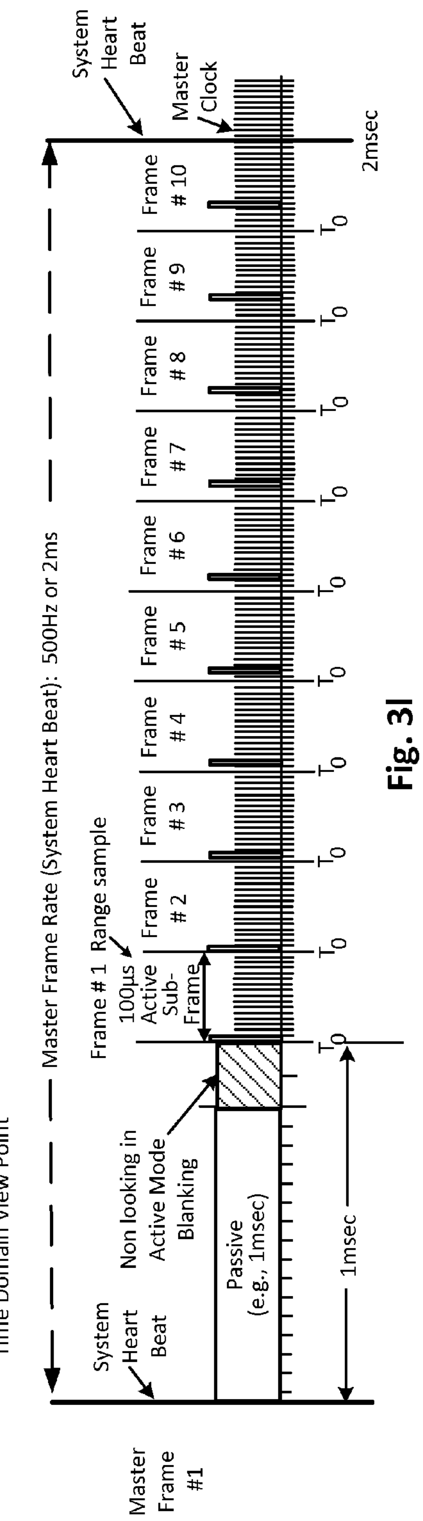
FIG. 3*l* shows the same acquisition but with a time domain view point with the proper sequencing of events.

FIGS. 3*k-l* each illustrate an example timing diagram showing part of a DIRCM sequence for passive track with ranging starting at the beginning, at short range first, in accordance with an embodiment of the present invention. FIG. 3*k* is with respect to the range domain view point for acquisition, and FIG. 3*l* is showing the same acquisition with respect to the time domain view point with the proper sequencing of events. As can be seen in this example embodiment, the passive acquisition has set the passive mode integration time at 1 msec, leaving 1 msec for active ranging in this example case. This results in 10 range samples at 100 μsec each which fill the rest of the Master Frame time of 2 msec. As can be further seen in this example embodiment, the active range gates of a 0.5 μsec covers about 0.015 R in distance for each sample, where R is the maximum range. For this Master Frame #1, this would cover a range search for 0.015 R times 10, yielding 0.15 R total for this Master Frame.

Multi-Mode High-Speed Sensor

Figure 4A:
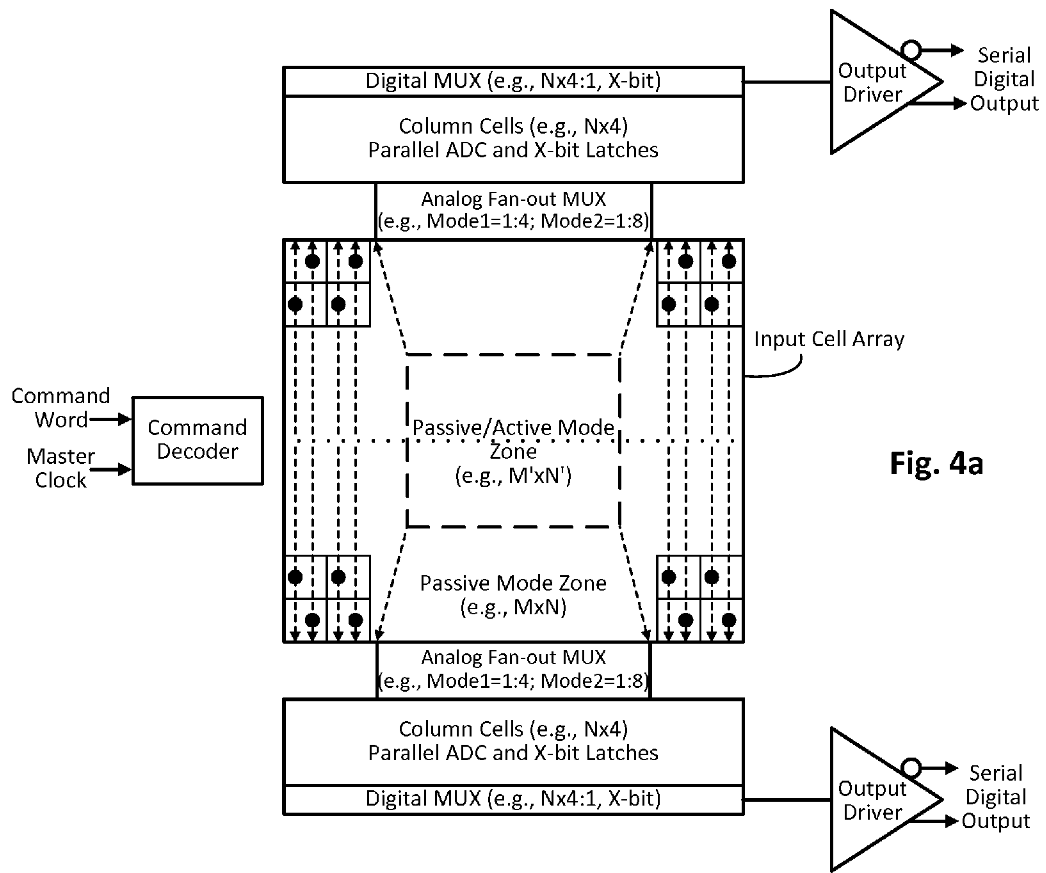
FIG. 4*a* illustrates a block diagram of an example sensor integrated circuit device that can be used, for example, in the countermeasure system of FIG. 1, configured in accordance with an embodiment of the present invention.

As will be appreciated in light of this disclosure, a multi-mode sensor configured in accordance with an embodiment of the present invention includes the capability to support passive and active IR operation, but numerous detection schemes will be apparent in light of this disclosure, including those suitable for other wavelengths of interest. FIG. 4*a* illustrates a block diagram of a sensor integrated circuit device configured in accordance with an embodiment of the present invention. As can be seen, the device includes a sensor portion and a readout portion. As will be appreciated in light of this disclosure, the device can be implemented using any number of semiconductor material systems and standard processing such as complementary metal oxide semiconductor (CMOS) processes. As will be further appreciated in light of this disclosure, such a configuration can be implemented to provide a system-on-chip capability to support various countermeasure and surveillance systems, such as DIRCM systems, multi-spectral surveillance cameras with range-finder capability, and 3D laser-radar (LADAR) sensor systems.

The sensor portion of this example embodiment includes an M×N array of detectors, and includes passive mode zone and a passive/active dual mode zone. The passive mode zone includes all M×N pixels of the array, while the dual mode zone includes only a subset of those pixels, and is generally designated as M'×N'. As will be apparent, the dual mode zone of the array can be used in both passive and active modes. During active mode operation, the outer passive zone pixels can be turned off to conserve power, in accordance with some embodiments. As will be appreciated in light of this disclosure, the dual mode zone of the array can be associated with readout circuitry including input unit cell pre-amplifiers that are configured for faster response time, which in some instances may be associated with higher power consumption, relative to the outer portion of the array. For instance, in one specific example, the sensor portion is implemented with a 256×256 array of HgCdTe detectors on 30 μm centers (pitch), and the readout portion is designed with a high-speed, low noise pre-amplifier that optionally includes both high and low gain modes for the input unit cells of the dual mode zone (example embodiments of which are discussed with reference to FIGS. 8*a* through 8*d*). In effort to conserve power, if so desired, relatively slower pre-amplifier circuitry can be used for the unit cells not in the dual mode zone (an example embodiment of which is discussed with reference to FIGS. 7*a* through 7*b*).

With further reference to the example device of FIG. 4*a*, the sensor portion is effectively divided into top and bottom halves, and the readout portion includes two serial digital data output drivers and two linear column cell arrays of on-board massively parallel X-bit analog-to-digital converters (ADCs), so that the top and bottom halves of the sensor portion each have an output driver and column cell array circuitry. The readout portion further includes two X-bit digital multiplexers, each of which receives the digital output of the corresponding column cells and provides a digital data stream to the corresponding digital data output driver. As will be appreciated, the resolution of the ADC latches and digital multiplexers (i.e., X) can be set as desired, given specifics for factors such as accuracy and processing power. As can be further seen in this embodiment, the number of column cells provided can be an integer multiple of the total columns of the array (i.e., N), which in the example case shown is N×4. For instance, assuming a 256 column sensor array in one specific example embodiment of the present invention, there would be 4×256 column cells, for a total of 1024 column cells.

The two serial digital data output drivers can be, for example, high-speed LVDS drivers, or any other suitable digital driver technology that can provide the desired performance criteria of the given application. With respect to the column cells, multiple ADCs can be configured per column of detectors to facilitate higher speed readout. For instance, in one example embodiment, 1024 column cells servicing each half of the sensor portion are provided, with eight 14-bit ADCs per column of detectors (each ADC associated with a 14-bit latch), thereby processing eight rows at a time to facilitate higher readout speed. In such an example case, the 4×N column cells in this example embodiment can be used, for example, to allow four rows to be read out simultaneously on each half of the sensor portion, as will be explained in turn. This provides a 4*x* speed advantage over reading out only a single row at a time for each half. With column cells along the top and bottom halves of the sensor portion, this example embodiment achieves an 8× speed advantage over an FPA that only reads out a single row at a time.

In more detail, and with further reference to the example embodiment of FIG. 4*a*, the column readout flexibility is designed to enable very high readout speed for the dual mode (e.g., normal speed and high-speed modes) central windowed area. To do so, this specific example embodiment includes an analog fan-out multiplexer (MUX) for each of the top and bottom halves. During normal speed mode, each of the analog fan-out multiplexers is configured to allow four rows to be read out simultaneously on each half of the sensor portion, in accordance with one example embodiment, thereby effectively providing eight ADCs (or column cells) per column of detectors during readout of the passive or the dual mode zones. Continuing with this example embodiment, during high-speed mode, each of the two analog fan-out multiplexers is configured to double or otherwise increase the number of ADCs (or column cells) per column of detectors during readout of the dual mode zone. For instance, in an example embodiment having eight ADCs (column cells) per column during normal mode, each of the analog fan-out multiplexers is further configured to allow eight rows to be read out simultaneously on each half of the sensor portion, in accordance with one example embodiment, thereby effectively providing sixteen ADCs (column cells) per column of detectors during readout of the dual mode zone. Thus, depending on the mode of operation, either eight or sixteen ADCs (column cells) per column of detectors service can be provisioned in this example. In a more general sense, the analog fan-out multiplexer fans the output of the sensor array columns to be serviced by ADCs out to additional ROIC column cells along the top and bottom of the array, so that multiple ADCs (column cells) are effectively provisioned for a given sensor array column, thereby providing a variable speed readout circuit. Note that each of the passive and active modes may both have multiple readout speeds.

As will be appreciated, each of the ADCs can be associated with a preamplifier circuit, in accordance with some embodiments. For example, each of the column cells can be configured with an ADC for converting an analog detector signal to a digital signal, and an amplifier or so-called preamplifier circuit for amplifying the analog detector signal to an acceptable level. Note, however, that other embodiments may be implemented without such ADCs. For example, other embodiments may be implemented with an analog multiplexer to multiplex the analog detector signals to a number of analog output ports. In a more general sense, each column cell can be configured to receive a detector signal from a corresponding column bus and to process that signal before sending it for additional processing (which could be the analog output ports of a multiplexer, as described in this paragraph, for instance).

Figure 4B:
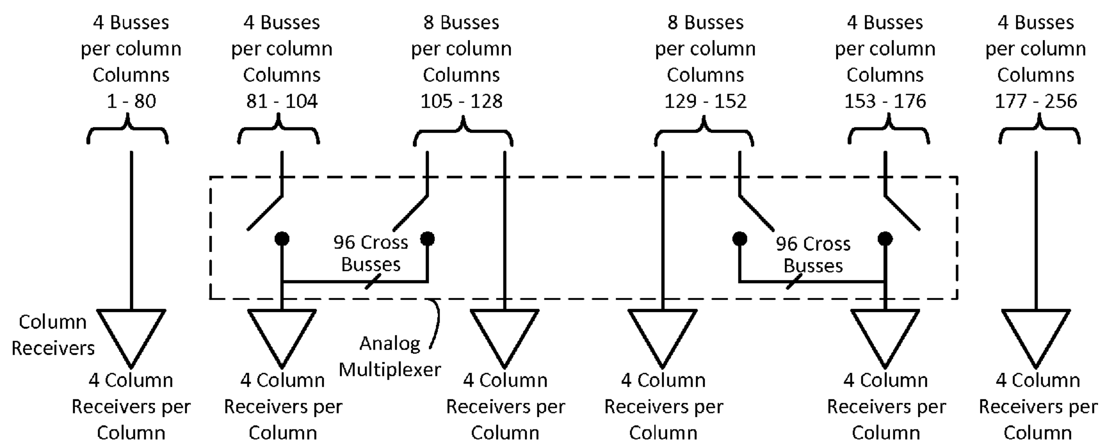
FIG. 4*b* illustrates an example analog fan-out multiplexer that can be used in the sensor of FIG. 4*a*, configured in accordance with an embodiment of the present invention.

FIG. 4*b* illustrates an example analog fan-out mux configured in accordance with one example embodiment of the present invention. As can be seen, the analog mux of this example configuration is basically a switch matrix that allows either four rows or eight rows to be readout simultaneously on each half. Thus, in some such embodiments, four rows are read out at a time in the normal mode for full FOV mode and is also the normal speed mode when windowed down to the narrow FOV of the central passive/active dual mode zone. A second high-speed readout mode is available in the narrow FOV mode with the ability to readout eight rows simultaneously on each half to double the readout rate. The analog fan-out mux is used to steer the row signals to take advantage of the additional column cells adjacent to but outside of the central column footprint of the dual mode zone. In this example embodiment shown in FIG. 4*b,* 96 column cells are targeted on either side of the central 192 columns to provide a total of 384 column cells which can readout as 48 columns×8 rows of information.

In addition, with further reference to the example embodiment of FIG. 4*a*, the readout portion of the device further includes a command decoder configured to add programmability to the ROIC. In one such specific embodiment, this includes not only various DACs to set operating current and voltage sources for optimum performance, but also the clocks necessary to run all aspects of the input cell including integration timing, reset functions, and sample and hold capability. This real-time programmability of the clock timing in such an embodiment allows, for instance, long to very short integration times independent of sensor frame start time (integration time can be positioned anywhere in time within the sensor's frame period). Also, time-delay-integration (TDI) active mode operation can be enabled with this programming flexibility. Also, in accordance with some embodiments, the command decoder of the readout portion is designed to update the synchronized interface command and control to support seamless transitions between the multi-mode operations. Also, the various modes that are commanded by the command decoder provide ROIC power management in some embodiments, so as to shut down unused portions of the chip to insure lowest operational power to support, for example, a low power and small cryo engine, if so desired.

Thus, in one specific example embodiment, a multi-mode sensor device is provided that has the following structure and functions. A wide field of view (WFOV) MWIR passive imaging mode is provided using, for example, a 256×256 array of detectors on 30 μm centers with a full frame readout in less than 1 msec. Continuing with this specific example embodiment, once the target/threat is apparent within the WFOV frame, the device can be commanded into a narrow field of view (NFOV) mode using, for example, only the central 48×48 pixels (or any other subset of the total pixels available). In such embodiments, a gimbaled turret can be used to center the target/threat in the FOV, for instance. Fast frames (e.g., 10 KHz frames) can be used with the NFOV frames. Both passive imaging and active laser ranging, for 3-D localization of the target/threat, can be performed while in the NFOV mode. In one specific example embodiment, active ranging uses programmable gates having a width from 125 nsec to more than 1 μsec in steps of 62.5 nsec. A coarse resolution ranging mode allows the gates to be placed at an integral number of gate widths after the active laser pulse occurs. A fine resolution ranging mode can be configured to move the gates in steps of, for example, 31.125 nsec. To improve dynamic range for active imaging, additional gain modes can be added, if so desired. For instance, one of the gain modes can be a low gain mode with 4 million electron well capacity, and a second gain mode can be a high gain mode with a 500 kilo-electron well capacity. In one such embodiment, both of these gain settings are available for both passive and active operation modes. Also, for weak returns at long ranges, the readout is capable of integrating multiple returns together in the input unit cell at a repetition rate of, for example, 33 μsec (or any other suitable rate). This time-delay-and-integration mode allows the input signal and noise to integrate up above the rest of the readout noise for enhanced sensitivity. Switching between WFOV and NFOV modes, as well as active and passive imaging modes, can occur seamlessly between frames, with virtually no loss in acquisition time, in accordance with some such embodiments. Such structure and functions provide a system-on-chip having capability to support numerous DIRCM and other such countermeasure system configurations.

Command Word for Laser and Sensor Control

FIG. 5*a* illustrates an example sensor command frame word, configured in accordance with an embodiment of the present invention. As can be seen, this example sensor command frame word has a 24-bit structure, and can be used in the passive command word structure. Each bit is a master clock. For instance, each bit represents 62.5 nsec, and each 24-bit word represents 1.5 μsec, in accordance with one specific example embodiment. In the example case shown, each word includes a 4-bit preamble field, a 4-bit instruction field, and a 16-bit data field. The word may be used to specify any number of sensor parameters, but in one example embodiment includes the following:

1) sensor initialization;
2) sensor operation mode (active/passive);
3) sets the start of integration period within the frame;
4) sets the end of integration within the frame;

5) sets the integration period location resolution;
6) sets the sensor FPA to either full FOV or windowed area;
7) laser blanking;
8) sensor FPA operational parameters;
9) command read-back;
10) readout data;
11) frame sync (frame start); and
12) test mode.

The active command word structure for the laser is illustrated in FIGS. 5*b-c*. In particular, FIG. 5*b* illustrates an example laser command frame word, and FIG. 5*c* illustrates an example laser command pulse descriptor word, each configured in accordance with an embodiment of the present invention. As can be seen, the active command word structure of this example embodiment has a 48-bit word structure, which includes a 16-bit laser command frame word (FIG. 5*b*), and a 32-bit laser command pulse descriptor word (FIG. 5*c*).

With respect to the 16-bit laser command frame word, each bit is a master clock. For instance, each bit represents 62.5 nsec, and each 16-bit word represents 1.0 μsec, in accordance with one specific example embodiment. In the example case shown, each word includes a 3-bit status field, a 4-bit sequence field, a 4-bit control field, and a 2-bit flag field (note that some bits may be unused). The 16-bit word may be used to specify any number of laser parameters, but in one example embodiment includes the following:

1) status request:
   a) request laser control (for bit);
   b) laser down-link status; and
   c) System Heart Beat status;
2) time tag for sequentially and event commands; and
3) laser control for:
   a) selecting laser output spectral band/bands;
   b) set laser repetition rate; and
   c) set laser output power.

With respect to the 32-bit pulse descriptor word, each bit is a master clock. For instance, each bit represents 62.5 nsec, and each 32-bit word represents 2.0 μsec, in accordance with one specific example embodiment. In the example case shown, each word includes an 8-bit TX Start LSB field, an 8-bit TX Start MSB field, an 8-bit TX Duration LSB field, and an 8-bit TX Duration MSB field. In some such embodiments, the TX pulse start time is always relative to the start of the System Heart Beat. The 32-bit word may be used to specify any number of laser parameters, but in one example embodiment includes the following:

1) TX pulse start time LSB (least significant bit);
2) TX pulse start time MSB (most significant bit);
3) TX pulse duration (run) time LSB; and
4) TX pulse duration (run) time MSB.

The sensor command frame word can be decoded in, for example, silicon discrete logic built into the sensor ROIC, which in some embodiments may be operating at sub-freezing temperatures (e.g., cryogenically cooled). In some embodiments, this decoding is carried out by the command decoder shown in the example embodiment of FIG. 4*a*. The command word structure for the laser can be decoded, for example, in a field programmable gate array (FPGA) within the processor of the laser sub-assembly, as shown in the example embodiment of FIG. 1. As will be appreciated in in light of this disclosure, both of these laser and sensor sub-assemblies work synchronously in real-time, given the synchronized interface command and control.

Figure 5D:
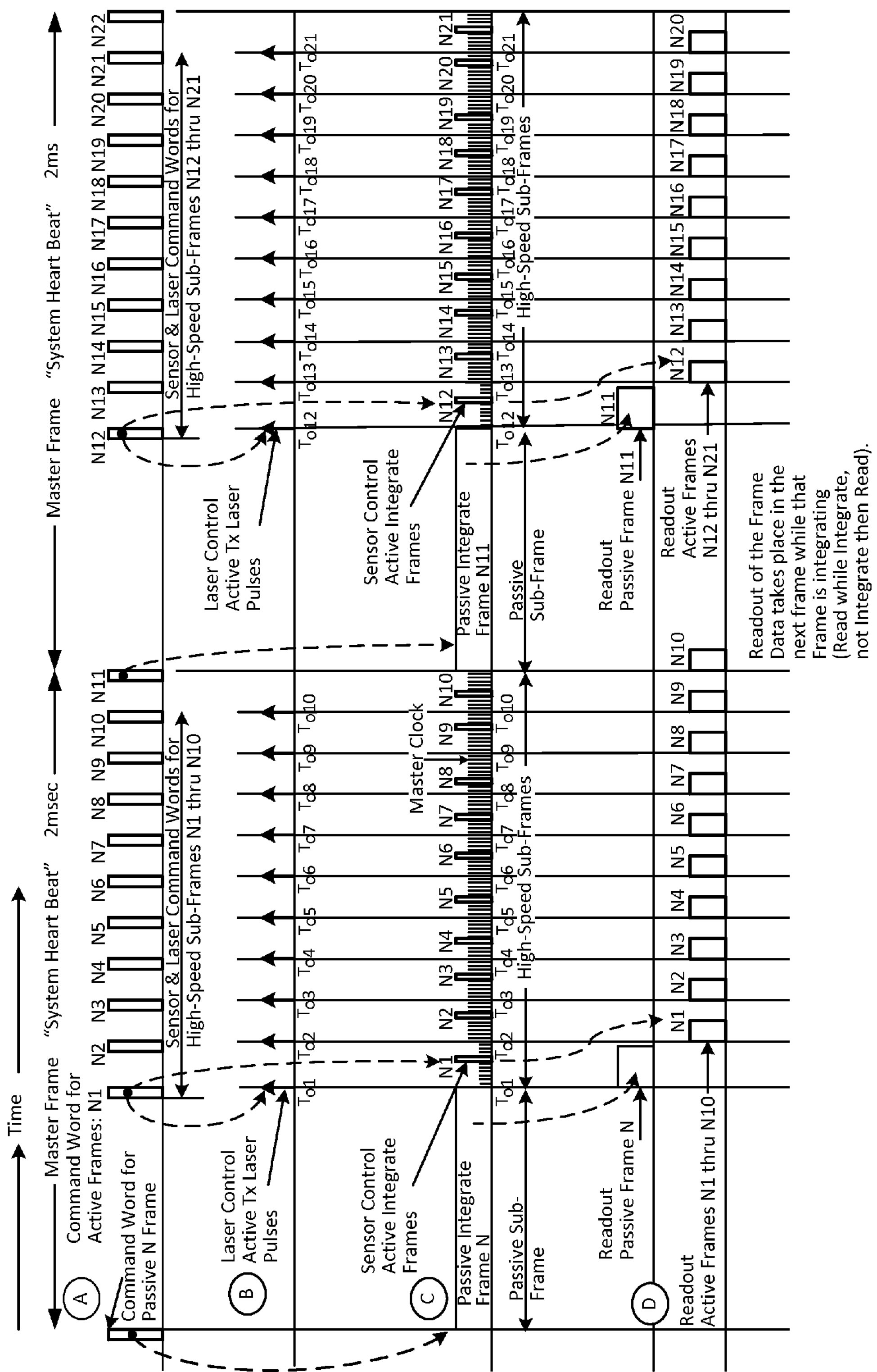
FIG. 5*d* illustrates various timing diagrams that correspond to the sensor and laser command words of FIGS. 5*a-c*.

FIG. 5*d* illustrates various timing diagrams that correspond to the sensor and laser command words of FIG. 5*a-c*. As can be seen, the diagram illustrates two sequential Master Frames of system operation. The top line of the diagram generally designated with 'A' represents the passive and active command word for each of the next periods of integration or sub-frames of the Master Frame. In this example, the passive integration was set at a time to enable ten active sub-frames following the passive integration period.

As can be further seen in this example, the passive integration command starts with the command word shown before the start of the first Master Frame period, followed by a number of active sub-frames (generally designated N1 through N10). The diagram further illustrates what frame N+1 of execution to which that command word is linked, by way of dashed arrows. For instance, the first passive integration command word from line 'A' of FIG. 5*d* is shown with a dashed arrow to the first execution of passive integration period or sub-frame in line 'C' of FIG. 5*d*. Likewise, the first active integration period within the active sub-frame at N1 of line 'A' is shown with a dashed arrow down to the execution period shown in line 'C'.

The second line of the example timing diagram of FIG. 5*d* generally designated with 'B' represents the transmitted laser pulses illustrating the time $T_0$ for each sub-frame ($T_{o1}$, $T_{o2}$, . . . $T_{o10}$). This $T_0$ time can be used as a reference for range measurements for that particular sub-frame. Recall that the $T_0$ sensor is shown in the example embodiment of FIG. 1, and can be used to measure exactly when the pulse was transmitted to obtain accurate timing used for precise range measurements. As will be appreciated in light of this disclosure, this approach can be used to eliminate any jitter and delays in the timing measurements associated with all the components in the timing chain, in accordance with some embodiments. The timing for the laser transmitted pulses can be controlled, for instance, by the laser command frame word structure (FIG. 5*b*) and the laser command pulse descriptor word (FIG. 5*c*).

The third line of the example timing diagram of FIG. 5*d* generally designated with 'C' illustrates the execution of the commanded word. Notice that the execution period is always one sub-frame after the commanded sub-frame, in accordance with one example embodiment. Further note that the very fine lines in this line represent the master clock resolution. In this example embodiment, a part of a system sequence is illustrated for passive track with active ranging starting at the short range first. The passive acquisition has set the passive mode integration time at 1 msec in this example case, leaving a 1 msec for active ranging, given a 500 Hz frame rate. In the given example embodiment, this results in 10 range samples (N1 through N10) at 100 μsec sub-frame periods, which fill the rest of the Master Frame time of 2 msec.

The fourth line of the example timing diagram of FIG. 5*d* generally designated with 'D' illustrates each sub-frame for the data to be readout which is shown with dashed lines to indicate the association with the execution sub-frame shown in line 'C' that generated the data. As can be further seen, the readout of the data takes place in the next frame from the execution frame, so as to provide a 'Read While Integrate' process, rather than an 'Integrate then read' process, which would take longer. Numerous variations and frame configurations/timing will be apparent in light of this disclosure, and the depiction on FIG. 5*d* is intended as one example.

Multi-Zone Approach for Active/Passive Focal Plane Array (FPA)

Figure 6:
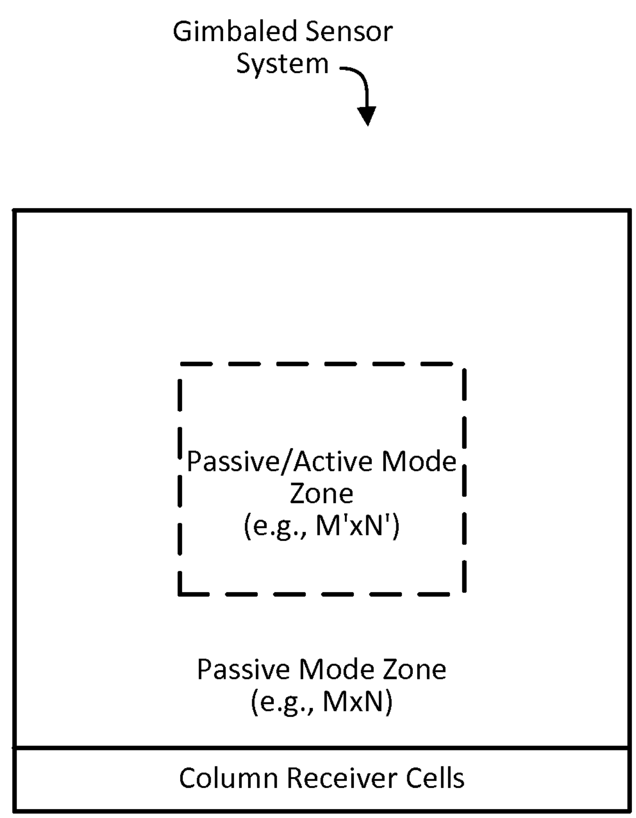
FIG. 6 illustrates a diagram view of a two-zone approach for an active/passive sensor array that can be used in the sensor circuit of FIG. 4*a*, configured in accordance with an embodiment of the present invention.

FIG. 6 illustrates a diagram view of a two-zone approach for an active/passive sensor, configured in accordance with an embodiment of the present invention. As will be appreciated in light of this disclosure, the entire M×N (e.g., 256×256) for WFOV passive imagery may be used to acquire and localize a target threat (or other target of interest). Numerous array sizes and configurations may be used depending on factors such as particulars of the given application and cost constraints, and the claimed invention is not intended to be limited to any particular array.

With the aid of a gimbaled mount, the target/threat can be placed and maintained in the central region of the array generally designated as the passive/active mode zone, and which is a subset of the M×N array, or M'×N' (e.g., 48×48, in one example embodiment). This is a form of windowing. However, unlike with standard windowing, these central input cells also are capable of operating as both passive and high-speed active receiver cells. Such centrally located high-speed active/passive dual mode cells achieve high frame rates while saving considerable power by avoiding having to make the entire array of dual mode or other high performance input cells. As will be appreciated, the sensor assembly can be operatively coupled to the gimbal as conventionally done. Any suitable gimbal technology can be used that meets the desired performance criteria (e.g., slew speed, range of operation, size and weight, etc).

Amplifiers for Sensor Array Input Unit Cells

FIG. 7*a* illustrates a general differential amplifier that can be used in the sensor input unit cells, in accordance with some embodiments of the present invention. FIG. 7*b* schematically illustrates the differential amplifier of FIG. 7*a*. As can be seen, the amplifier includes five transistors ($T_1$-$T_5$) and is operatively coupled between power supplies VDD and VSS. The differential pair of transistors $T_2$ and $T_3$ receives the differential input signal (IN+, IN−). In addition, transistors $T_4$ and $T_5$ operate as the load devices of the amplifier and are connected as a master-slave current-source pair to ensure that both legs have the same current. The non-inverting leg of the differential amplifier includes $T_2$ and $T_4$, and the inverting leg includes $T_3$ and $T_5$. As will be appreciated, note that the situation where the current-source pair ensures that both legs have the same current only applies when no external current is drawn from the amplifier output, such as under quiescent conditions with no DC load externally connected to the amplifier output. On the other hand, when output current is drawn, the current source pair maintains equal currents in transistors $T_4$ and $T_5$, but the current in transistor $T_3$ will be different. Transistor $T_1$ operates as a current source during normal operation, and sets the amplifier operating current or quiescent point based on the value of $V_Q$, which can be set as desired for a given application, as can the value of the power supplies VDD and VSS. In some embodiments, the rapid readout rate enabled by the sensor configuration shown in FIG. 4*a* (including the analog fan-out mux and oversized column cell array) can be used in conjunction with such a differential amplifier configuration.

In accordance with other embodiments of the present invention, the load transistor $T_4$ can be reconfigured into a current source, thereby increasing the gain of the differential amplifier non-inverting leg used to drive transistor $T_5$, which drives the amplifier output. This very efficiently creates, in effect, an additional stage of gain, which can be configured with an optional compensation circuit, in accordance with various such embodiments of the present invention. As will be further appreciated in light of this disclosure, the effect on amplifier performance by such a reconfiguration as provided herein is significant. FIG. 8*a* generally illustrates an amplifier circuit configured in accordance with one such embodiment. FIG. 8*b* schematically illustrates the differential amplifier of FIG. 8*a*.

As can be seen, the amplifier includes five transistors ($T_1$-$T_5$) and is operatively coupled between power supplies VDD and VSS. Transistor $T_1$ operates as a current source during normal operation, and sets the amplifier operating current or quiescent point based on the value of $V_Q$, which can be set as desired for a given application, as can the value of the power supplies VDD and VSS. The differential pair of transistors $T_2$ and $T_3$ receives the differential input signal (IN+, IN−). In addition, transistors $T_4$ and $T_5$ operate as the load devices of the amplifier. The non-inverting leg of the differential amplifier includes $T_2$ and $T_4$, and the inverting leg includes $T_3$ and $T_5$.

In addition, and in accordance with an embodiment of the present invention, the load transistor $T_4$ is effectively reconfigured into a current source by applying a bias $V_p$ to its gate, and in some such cases, a compensation circuit can be added across load transistor $T_4$. The addition of this current source has the effect of increasing the gain of the differential amplifier non-inverting leg used to drive transistor $T_5$, which drives the amplifier output. As previously explained, the addition of this $T_4$-based current source creates, in effect, an additional stage of gain. The bias signal $V_p$ supplied to the gate of transistor $T_4$ effectively sets the nominal current through transistor $T_4$. In one example embodiment shown, the bias signal $V_p$ is a DC voltage. The value of $V_p$ can be set as desired. In one example embodiment, for instance, $V_p$ is set so that the nominal current through transistor $T_4$ is about one-half the current through $T_1$.

In this example configuration, complementary metal oxide semiconductor (CMOS) technology is employed, in that the transistors $T_2$ and $T_3$ are implemented with p-channel field effect transistors (FETs), and the load transistors $T_4$ and $T_5$ are implemented with n-channel FETs. Other embodiments may employ, for example, use of n-channel FETs for transistors $T_2$ and $T_3$, with p-channel FETs for load transistors $T_4$ and $T_5$. In such a case, note that VDD and VSS is reversed as well, and transistor $T_1$ would be an n-Channel FET (to be compatible with transistors $T_2$ and $T_3$). In other embodiments, transistors $T_2$ and $T_3$ may be implemented with PNP BJTs, and load transistors $T_4$ and $T_5$ may be implemented with NPN BJT load transistors. In still other embodiments, transistors $T_2$ and $T_3$ may be implemented with NPN BJTs, and load transistors $T_4$ and $T_5$ may be implemented with PNP BJT load transistors (again, in this latter case, VDD and VSS would be reversed as well; in addition transistor $T_1$ can be selected to be compatible with transistors $T_2$ and $T_3$). Numerous variations will be apparent in light of this disclosure, and the claimed invention is not intended to be limited to any particular transistor technology. As will be appreciated, transistors $T_3$ and $T_5$ effectively drive the amplifier output, and transistors $T_2$ and $T_4$ effectively drive transistor $T_5$.

In the example embodiment shown in FIG. 8*c*, the optional compensation circuit is implemented with a resistor R and capacitor C serially connected across the drain and source of transistor $T_4$. As will be appreciated, the values of resistor R and capacitor C of the compensation circuit generally depend, for instance, upon the specific characteristics of the transistor devices ($T_2$ through $T_5$) used and their operating conditions. In another embodiment of the present invention, the optional compensation network can be implemented as shown in FIG. 8*d*, where the resistor R has been replaced with a transistor $T_6$ (which is implemented with an n-channel FET in this example case). As will be appreciated, a FET with a DC voltage above threshold applied to its gate will generally act like a resistor if there is no DC voltage between the source and drain. As the drain-to-source voltage is increased, it increasingly begins to act like a current source. Thus, in the context of this example embodiment, the source and drain of transistor $T_6$ effectively act as resistor terminals, and the gate of transistor $T_6$ is connected to a DC bias voltage, such as $V_p$, or other suitable bias signal.

In one specific example embodiment, assuming an operating current provided by $T_1$ in the range of 1 to 5 microamps (e.g., 2 μA), the capacitor C of the optional compensation network can be in the range, for instance, of 20 to 200 femtofarads (e.g., 100 ff), and the resistive portion of the compensation network can be implemented with, for example, a FET having a gate length in the range of 1 to 10 microns and a width of about 1 micron. Other embodiments may employ a thin film resistor for the resistive portion of the compensation network (e.g., 10 k to 100 kΩ, such as 50 kΩ. As will be appreciated, numerous specific configurations can be implemented depending on the particulars of the given application, and the claimed invention is not intended to be limited to any particular operating parameters or component types/values.

As can be further seen in FIGS. 7*a*-*b* and 8*a*-*b*, the amplifier circuits can be further configured as a capacitive-feedback integrating amplifier, by virtue of capacitor $C_{int}$ connected from the amplifier output to the inverting input IN−. Each pixel of the sensor can be operatively coupled to such an amplifier circuit. The operating conditions for the amplifier are set when the output is momentarily shorted to the inverting input IN− when the Reset switch is closed. A bias signal $V_{bias}$ provided on the non-inverting input IN+ can be used to set the reset voltage that will be presented at the amplifier output during the reset interval. During the reset interval (assuming no external DC load), both devices $T_2$ and $T_3$ of the differential pair will be operating at the same current, in accordance with one example embodiment. The negative feedback of the amplifier after the reset operation maintains this condition, keeping the differential pair $T_2$ and $T_3$ balanced, and effectively stabilizes sensor bias. The capacitor $C_{int}$ in the feedback path of the amplifier integrates charge received from the sensor.

For passive tracking, an input preamplifier that provides a response time commensurate with the desired integration time for passive tracking is adequate. For instance, in passive track mode, the integration time can be selected to obtain the optimum well fill and sensitivity. Since sensor noise increases slower than the target signal, it is often possible to have an integration time sufficiently long to insure a signal to noise ratio much greater than 1. An optimum integration time strives to achieve background limited performance without saturating the well charge capacity. However for active ranging the situation is different. For example, assume that the active laser pulse and subsequent return from the target is less than 20 nsec. In order to know the distance to the target, the time of flight of the return must be captured within a very narrow integration period. In some such cases, integration periods are less or equal to 0.5 microseconds, for instance. Longer integration time may allow returns from other objects at different ranges than the target and add clutter to the image, thereby making it more difficult to distinguish the target. For active ranging, the preamplifier requirements can be much faster than desired for passive tracking, in some embodiments. In such cases, the faster response time may require more amplifier power dissipation. Rather than configuring the entire M×N array with fast dual-mode amplifiers and taking the power hit this would entail, another approach is to configure a subset of the M×N array to be dual mode with the rest of the array being configured with standard preamplifier for passive tracking. In one such embodiment, a sensor system with a gimbal is used. The target is initially acquired and tracked by the passive M×N array. Once acquired, the gimbal can be used to place the target in a subset region of the M×N array with the high speed dual-mode preamplifiers to allow active ranging in addition to passive tracking with sub-set region of the array.

An example dual-mode gain configuration is shown in FIGS. 8*a*-8*b*, which further includes an additional capacitor $C_{HGM}$ that can be switched in during high-gain mode by the and the High Gain Mode switch. Thus, in some example embodiments, the gain mode can either be set to normal gain mode or high gain mode during readout of the subset of the M×N array. Other such multi-gain mode configurations will be apparent in light of this disclosure, and the claimed invention is not intended to be limited to any particular configuration. Further note that such a multi-gain mode configuration can also be applied to the example amplifier configuration shown in FIGS. 7*a*-*b*, as well as the one shown in FIG. 9.

Multi-Mode ROIC

Figure 9:
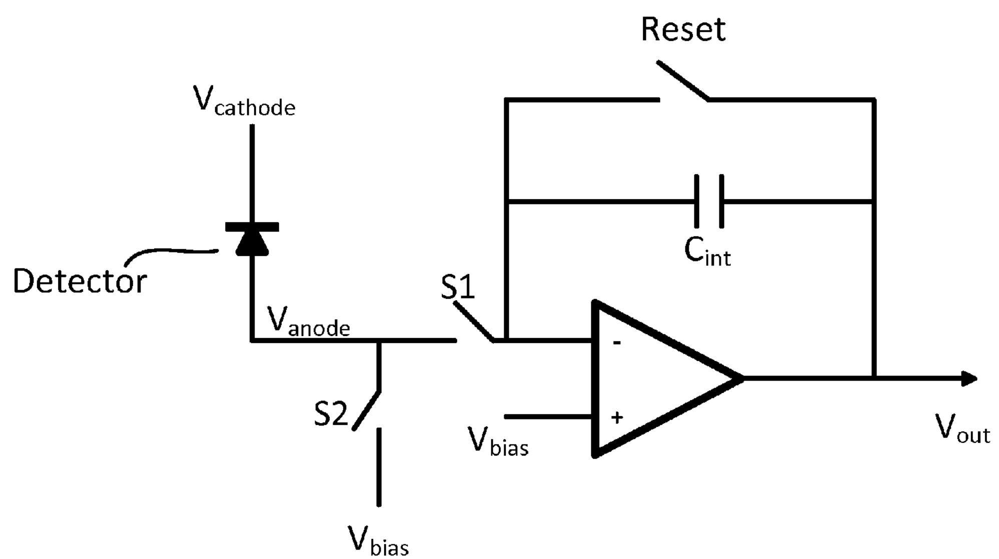
FIG. 9 illustrates a schematic of an integrator circuit configured in accordance with an embodiment of the present invention.

FIG. 9 illustrates a schematic of an integrating amplifier circuit configured in accordance with an embodiment of the present invention. As will be appreciated in light of this disclosure, the integrating amplifier can be used as a pre-amplifier in the input unit cells of a ROIC configured to readout a sensor array. The amplifier design allows the ROIC to be operated in a number of modes, which in one embodiment include: laser blanking mode; time delay integration (TDI) mode; coarse resolution ranging mode; and fine resolution ranging mode.

As can be seen, the amplifier may be an integrating amplifier with a capacitor $C_{int}$ and Reset switch, such as the example one shown in FIGS. 7*a*-*b* or the example one shown in FIGS. 8*a*-*b*. In addition, this example embodiment is configured with two switches $S_1$ and $S_2$ ahead of the amplifier. Switch $S_1$ may be connected between the output of a detector and the input of the pre-amplifier. Switch $S_2$ may be connected between the output of the detector and a fixed bias voltage, $V_{bias}$. Only one of the switches $S_1$ and $S_2$ may be closed (low impedance) at any given time. As will be appreciated, the detector can be, for example, a photodiode having a cathode and anode as shown, or any sensor that produces a change in current in response to a stimulus. This configuration allows for integration of the detector current when $S_2$ is open and $S_1$ is closed. The detector current integration may be stopped by opening $S_1$ and closing $S_2$, wherein the voltage $V_{bias}$ is chosen to keep the same bias across the detector when it is normally connected to the amplifier. Integration of the detector current can resume again if $S_2$ is opened and $S_1$ is closed. The Reset switch may operate independently from the switches $S_1$ and $S_2$. The non-inverting input of the amplifier may be connected to $V_{bias}$, while the inverting input may be connected to the detector via switch $S_1$.

As will be appreciated, while a differential inverting amplifier configuration is shown (having extrinsic inverting and non-inverting inputs) in FIG. 9, a single-ended inverting amplifier configuration can also be configured in accordance with an embodiment of the present invention, where there is only an inverting input. In such single-ended cases, the non-inverting input can be thought of as intrinsic, and may be, for instance, an internally biased node of the circuit.

Figure 10A:
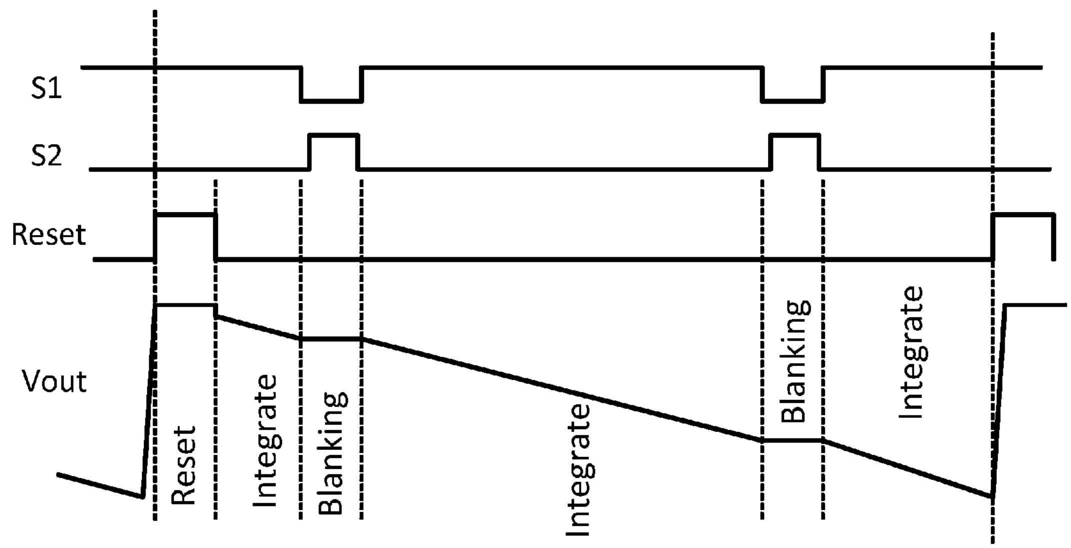
FIG. 10*a* illustrates a blanking interval timing diagram with integration intervals, in accordance with one embodiment of the present invention.

FIG. 10*a* illustrates the laser blanking mode of the ROIC, in accordance with one embodiment of the present invention. As shown, multiple integration intervals may be defined during a given frame time. The integration interval may occur when switch $S_1$ is closed, switch $S_2$ is opened, and Reset is opened. As can be seen, during the blanking intervals, the magnitude of $V_{out}$ may remain constant because switch $S_1$ is opened and $S_2$ connects the detector to $V_{bias}$. When integration resumes, the magnitude of $V_{out}$ may be substantially equal to its magnitude prior to the blanking interval. Blanking time can be determined, for example, from an external signal or other command signal indicating the need to interrupt the integration cycle. The blanking intervals and integration intervals can have different durations and positions within a given frame time.

As will be appreciated, the switches $S_1$ and $S_2$ may be implemented to divert an unwanted detector current. This detector current may be the result of, for example, backscattering of an initial pulse, other unwanted stray light, or any unwanted detector stimulus. In one such embodiment, the connecting the detector to $V_{bias}$ with switch $S_2$, while opening switch $S_1$, allows the voltage on the detector to be maintained while also shunting the charge created on the detector by excess stray light. Once the stray light event has passed, $S_2$ may be opened and $S_1$ may be closed again to resume the integration of the detector signal current. In one example embodiment, prior knowledge of stray light events can be communicated to the control electronics for these switches, which in some embodiments are implemented by the processor of the pointer/tracker sub-assembly of the example system shown in FIG. 1, or by the command decoder of the example sensor shown in FIG. 4*a*.

Figure 10B:
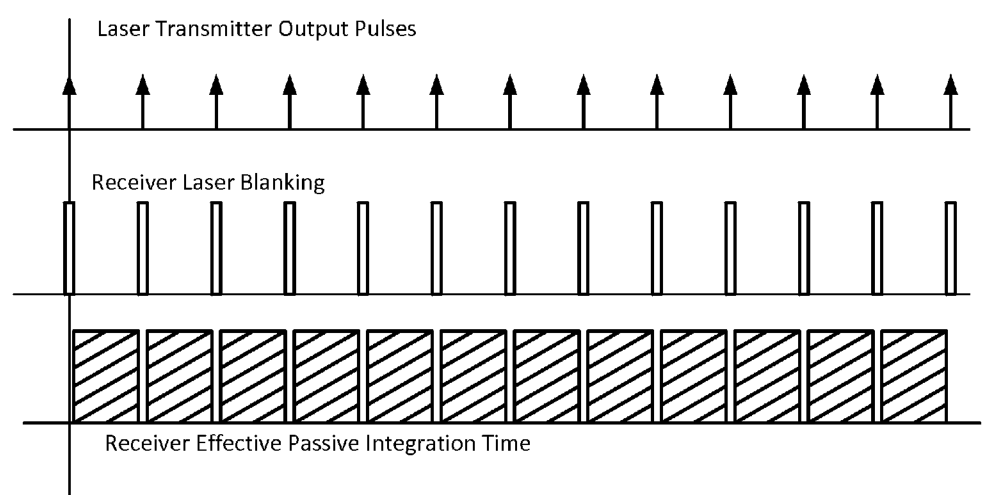
FIG. 10*b* illustrates a laser blanking and integration timing diagram in accordance with one embodiment of the present invention.

FIG. 10*b* illustrates a laser blanking and integration timing diagram in accordance with one embodiment of the present invention. In this particular embodiment, a laser emits output pulses, as shown on the top timing diagram. In order to prevent any backscatter from the output pulse from being detected by the sensor/detector, a blanking interval may accompany the output pulse. The blanking interval is shown in the middle timing diagram, accompanying the output pulses. This laser blanking technique can eliminate self-blinding by the output laser pulse when the system is, for instance, utilizing the sensor in the passive mode. The bottom timing diagram shows the effective passive integration time of the receiver. In this embodiment, no integration occurs during the blanking interval to prevent backscatter detection. The effective passive integration time may also account for the blanking time required for each pulse.

Figure 11A:
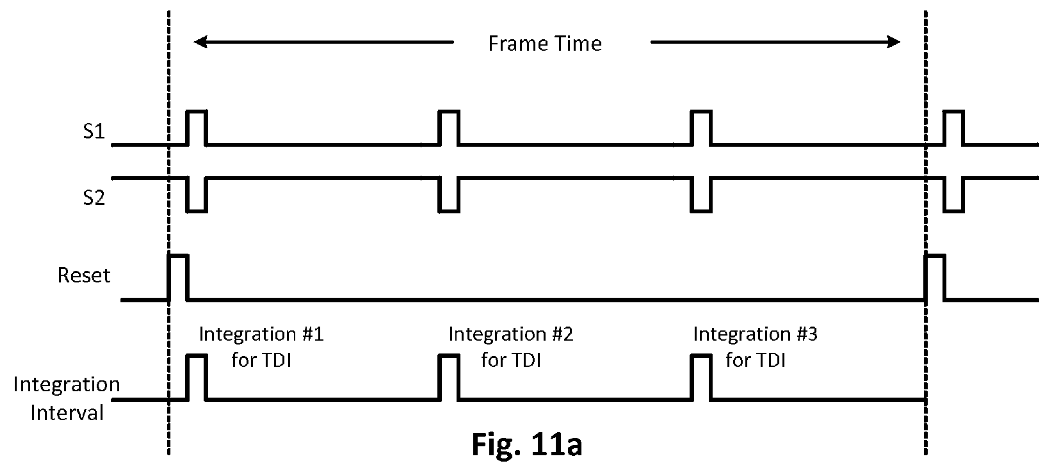
FIG. 11*a* illustrates the active time delay integration (TDI) function, in accordance with an embodiment of the present invention.

FIG. 11*a* illustrates the active TDI mode of the ROIC, in accordance with an embodiment of the present invention. As shown in this example, the frame time can be determined by the time between Reset intervals. The timing of the switches $S_1$, $S_2$, and Reset can be controlled to achieve the integration of multiple returns onto a pre-amplifier integration capacitor within a single frame time. In the example embodiment shown, three integration intervals may be achieved within a frame time, although more or less integration intervals are possible within a frame time in different embodiments. The integration intervals may be identically spaced within the frame time, or may be positioned in any other desired configuration. In this particular embodiment, the reset occurs at the beginning of each frame time. The ability to perform multiple integration intervals within a given frame time can be used, for instance, to increase the sensitivity of a sensor element without altering the frame time.

Figure 11B:
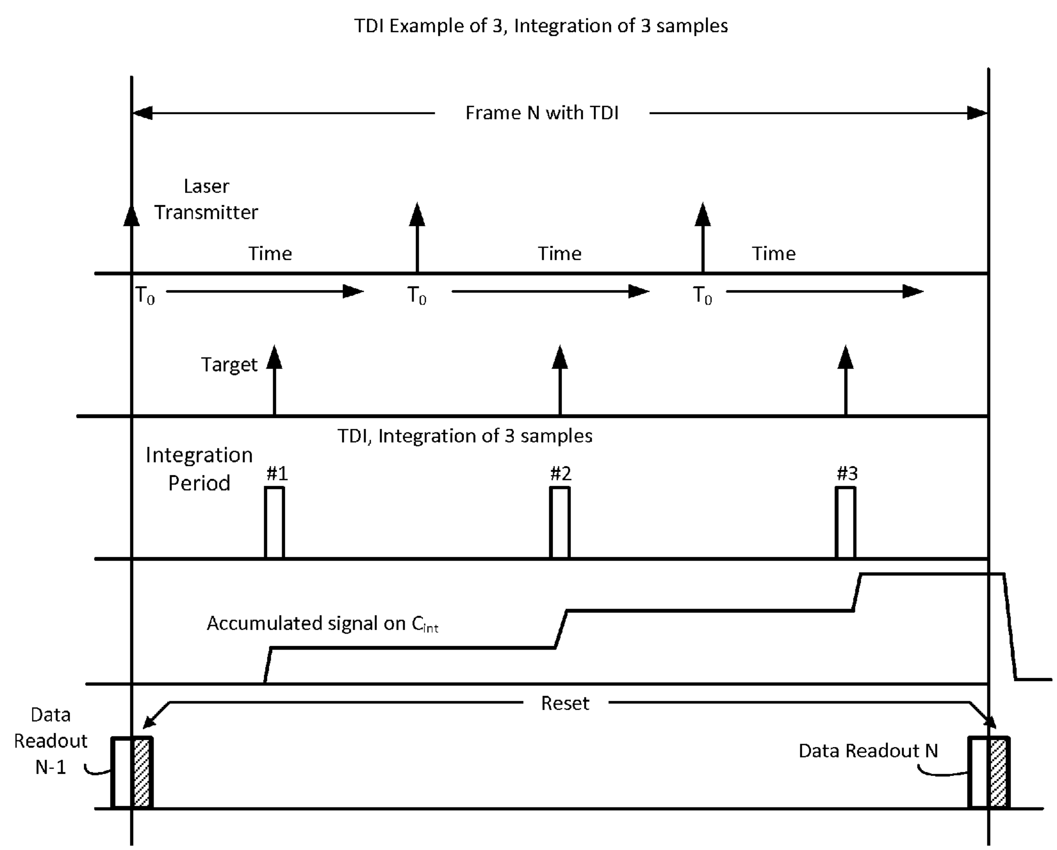
FIG. 11*b* illustrates a TDI timing diagram with multiple output pulses and multiple integration intervals, in accordance with one embodiment of the present invention.

FIG. 11*b* illustrates a TDI timing diagram with multiple output pulses and multiple integration intervals, in accordance with one embodiment of the present invention. As will be appreciated in light of this disclosure, TDI techniques provided herein may be implemented with a laser pulse transmitter that searches for a target location by receiving reflections of the laser output pulses from the target. Multiple output pulses may be transmitted within an image frame, with each pulse sent out at time $T_0$ with respect to that particular pulse. Other implementations with more or fewer output pulses will further be apparent in light of this disclosure. The image frame time, and therefore the time between resets, may be determined by the output pulse repetition rate. The number of integration intervals may be determined by the number of output pulses, the amount of sensitivity desired, and/or by other factors. As the system searches to locate a target in range, more sensitivity may be required as a search in range is increased. The TDI mode may be invoked and the number of TDI samples may be increased accordingly. In the search of an optical return, for instance, the receiver integration period (or gate time) may be incrementally placed later in time until the desired range is covered. As shown in FIG. 11*b*, three laser pulses are transmitted and the return from the target is received for each corresponding pulse. The three returns may be received (#1, #2, and #3) and integrated using the TDI techniques described herein. The sum of the integrated samples at the end of the frame time may be sampled and available to be read out. The readout may take place simultaneously with the integration of the subsequent frame time.

According to one embodiment of the present invention, the data from the integration intervals is read out at the end of each frame time. Just before the reset, the information captured on the integration capacitor $C_{int}$ may be read out, and this may introduce readout noise. In one embodiment, particularly when the return signal to read noise ratio is low, integrating multiple returns in the TDI mode can improve this signal to noise ratio. Integrating three returns within one frame, for example, may result in three times the signal to noise ratio compared to integrating only a single return. In one example embodiment, TDI techniques can allow more than one return to be captured and integrated within a frame time, allowing the desired signal level to overcome readout noise of the sensor array. In one such embodiment, this added sensitivity can be used to increase range or lower the optical power of the active system. Other such benefits will be apparent in light of this disclosure.

Range Gating Functionality

While actively searching for a signal during a frame time, it may be desirable to customize the position of the integration interval within a frame time. When searching for an optical return or reflection after sending out an initial output pulse, the timing of the optical return within a frame time may correspond to a distance in range. According to one embodiment of the present invention, range gating can provide high-speed missile countermeasure systems with accurate knowledge of a missile's distance and velocity vector. When searching for a missile in range, it may be desirable to change the position of the integration interval within a frame seamlessly from one frame interval to the next. This may allow the integration intervals to not be strictly dependent upon the start of the frame time.

Figure 12A:
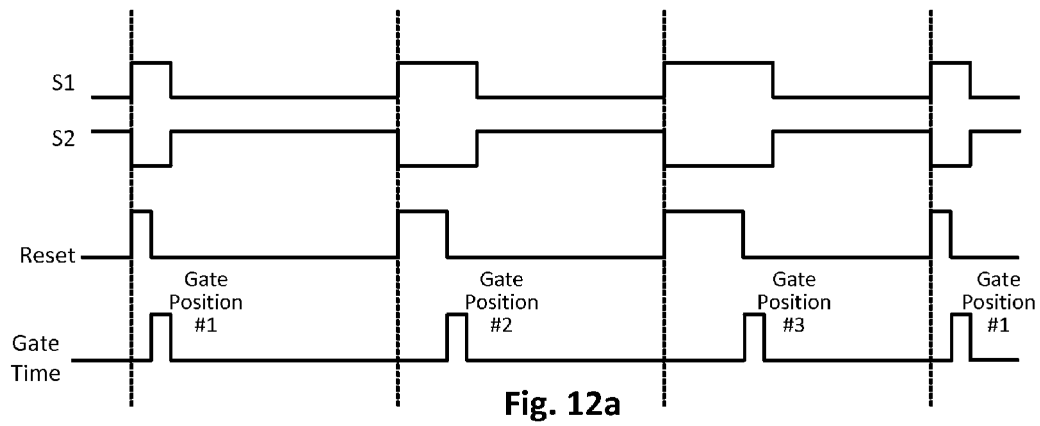
FIG. 12*a* illustrates a range gating timing diagram, in accordance with an embodiment of the present invention.

FIG. 12*a* is a time diagram illustrating range gating, in accordance with an embodiment of the present invention. As can be seen, the location of the gate time (also called the integration interval) within a frame can be changed from frame to frame seamlessly. In one such example, the gate time shifting is accomplished through manipulating switches $S_1$, $S_2$, and Reset as shown in FIG. 12*a*. In this example embodiment, the start of Reset determines the beginning of each new frame interval. Switches $S_1$ and Reset may be connected at the beginning of a frame interval, and after the desired delay Reset may be opened to allow for integration of the detector output. This technique allows for the gate time to be shifted within a frame interval. In addition to the embodiment shown in FIG. 12*a*, range gating may be implemented along with the blanking and/or TDI modes described herein. Other switching and timing configurations will be apparent in light of this disclosure and the claimed invention is not intended to be limited to any particular switching scheme.

Fine Resolution Gating Control

Range gating generally involves staggering the integration intervals within a frame time based on over sampling of the target, and can help accomplish fine resolution gating control in accordance with some example embodiments of the present invention. When searching for a signal, such as an optical return, the resolution of the detection is often limited by the size of the integration interval, or gate time. While a given static or otherwise uncustomizable gate timing may be suitable for a given application, that particular gate timing may not be suitable for other applications. In addition, greater resolution may be required than any single gate time can allow. In these instances, the resolution of a typical detector may be limited to the available gate time.

Figure 12B:
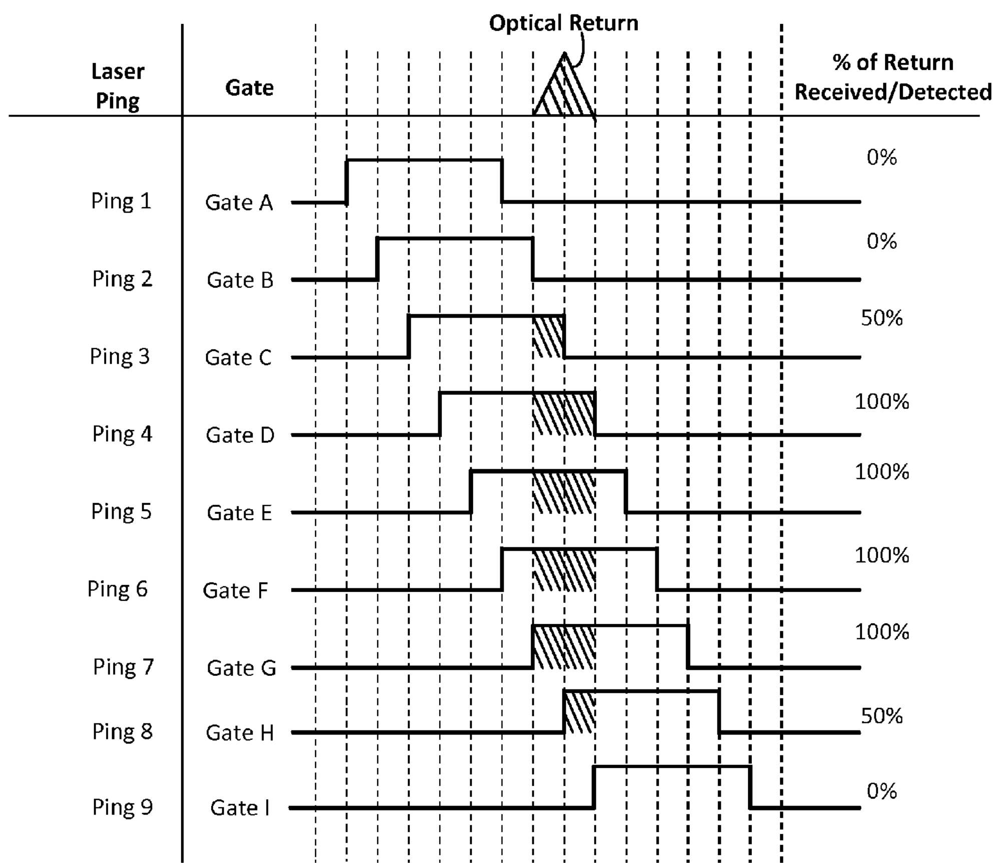
FIG. 12*b* illustrates a fine resolution gating control timing diagram, in accordance with an embodiment of the present invention.

FIG. 12*b* illustrates a timing diagram that demonstrates fine resolution gating control, in accordance with an embodiment of the present invention. The footprint of the optical return may be much narrower than the gate time, and in this particular example, the optical return is ⅖ the size of any given integration interval. A range gating scheme may be configured in accordance with an embodiment of the present invention, such that the gate time for each of a plurality of laser pings is shifted within the frame time by subintervals of the gate time. In the example shown, for instance, the gate is shifted in time by ⅕ of the total gate time. Other embodiments can have other such subintervals. In any case, subinterval shifting of the gate time within the frame time (and/or between resets of the integration capacitor) may be accomplished through the range gating techniques are previously described, such as by manipulating the $S_1$, $S_2$, and Reset switches in accordance with some embodiments. The technique may be used, for example, for fine gating control on a frame to frame basis to increase LIDAR ranging resolution, in accordance with some embodiments.

In the particular example shown in FIG. 12*b*, the gate width is divided into five subintervals. A total of nine laser pulses (Pings 1-9) and corresponding gate intervals (Gates A-I) are shown, along with the percentage of the optical return captured for each gate interval. As will be appreciated, measurement by an optical sensor captures both the time-position and amplitude of the optical return. In the example case shown, Gates A and B do not detect any part of the optical return, Gate C allows 50% of the optical return to be captured, and Gates D-G allow 100% of the optical return to be captured. Being later in time, Gate H only captures 50% of the optical return and Gate I captures none of the optical return.

The output response of each gate time may be recorded, and in one example embodiment a centroid algorithm can be used to weight the returns according to their amplitude and time-position. As will be appreciated in light of this disclosure, this hyper-resolution gating technique may resolve shorter returns than a single integration interval is capable of doing. This technique may also allow for much higher resolution in detecting an optical return (or other such ping-based reflection from the target) without increasing the speed or decreasing the size of the integration intervals, in accordance with some embodiments.

Thus, in accordance with an embodiment of the present invention, rather than narrowing the integration intervals, the position of the integration intervals can be shifted in time at subintervals of the gate width. After returns for each of the subintervals are acquired, they can be analyzed or processed to determine the probability of an object at a finer resolution than would be possible without using narrower pulses. Note that the laser pings and corresponding gate intervals can be executed, for example, in different consecutive frames in some embodiments, or in consecutive sub-frames of a given Master Frame in other embodiments.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A sensor readout device for operation with a sensor array having rows and columns of detectors, the device comprising:
- a column cell for receiving a detector output signal from a first row of a column of the sensor array;
- an additional column cell; and
- an analog multiplexer configured to steer a detector output signal from a second row of the column of the sensor array to the additional column cell, thereby allowing multiple rows of the sensor array to be readout simultaneously;
- wherein the device includes a plurality of column cells that includes the column cell and additional column cell, and at least some of the column cells in the plurality are associated with an active/passive dual mode zone of the sensor array and comprise an amplifier circuit having multiple gain modes.

2. The device of claim 1 wherein the analog multiplexer is a fan-out multiplexer.

3. The device of claim 1 wherein each of the column cell and the additional column cell is configured with an analog-to-digital converter for converting an analog detector signal to a digital signal and an amplifier circuit for amplifying the analog detector signal.

4. The device of claim 1 wherein the multiple gain modes include a normal gain mode and a high gain mode switchably available during readout of the subset of the sensor array.

5. The device of claim 1 wherein the device further comprises the sensor array.

6. The device of claim 5 wherein the sensor array includes an active/passive dual mode central windowed area.

7. The device of claim 5 wherein the sensor array includes M×N pixels, and all available M×N pixels are used for detecting a target during a passive mode, and a subset of the available M×N pixels is used for detecting during the passive mode and an active mode, and column cells associated with the subset of the available M×N pixels are configured differently than the other available column cells.

8. The device of claim 5 wherein the sensor array includes M×N pixels, and all available M×N pixels are used for detecting a target during a passive mode, and a subset of the available M×N pixels is used for detecting during the passive mode and an active mode, and the analog multiplexer allows columns of the subset to be readout at two or more speeds.

9. The device of claim 8 wherein the two or more speeds include a normal speed which is used during the passive mode and a higher speed which is used during the active mode.

10. The device of claim 9 wherein the normal speed can also be used during the active mode and/or the higher speed can be used during the passive mode.

11. The device of claim 5 wherein the sensor array is divided into portions, and each portion is serviced by an analog multiplexer configured to steer detector output signals from rows of given column of that sensor array portion to additional column cells dedicated to that sensor array portion.

12. The device of claim 1 further comprising a command decoder configured to provide timing control including at least one of start and end of integration time independent of sensor frame period, multiple integrations within a frame period, and multiple blanking intervals within a frame period.

13. The device of claim 1 further comprising a command decoder configured to support seamless transitions between modes of operation including at least one of: active/passive detecting modes; wide/narrow field of view modes; and normal/fast readout speed modes.

14. The device of claim 13 wherein the command decoder is further configured to provide power management optimization for the modes of operation.

15. The device of claim 1, further comprising:

an analog multiplexer for multiplexing output of the column cells into a serial data stream; and an output driver for driving the serial data stream.

16. A sensor system comprising the device of claim 1.

17. A system-on-chip comprising the sensor system of claim 16.

18. A sensor readout system, comprising:

a sensor array having rows and columns of detectors for providing analog detector signals, wherein the sensor array includes M×N pixels, and all available M×N pixels are used for detecting a target during a passive mode, and a subset of the available M×N pixels is used for detecting during the passive mode and an active mode;

a column cell for receiving a detector output signal from a first row of a column of the sensor array;

an additional column cell; and a multiplexer configured to steer a detector output signal from a second row of the column of the sensor array to the additional column cell, thereby allowing multiple rows of the sensor array to be readout simultaneously, and wherein the multiplexer allows columns of the subset to be readout at two or more speeds.

19. The device of claim 18 wherein column cells associated with the subset of the available M×N pixels are configured differently than the other available column cells.

20. A sensor readout system, comprising:

a sensor array having rows and columns of detectors for providing analog detector signals, wherein the sensor array includes M×N pixels, and all available M×N pixels are used for detecting a target during a passive mode, and a subset of the available M×N pixels is used for detecting during the passive mode and an active mode, and wherein the sensor array is divided into multiple portions;

a first column cell for receiving a detector output signal from a first row of a first column in a first portion of the sensor array;

a first additional column cell;

a first multiplexer configured to steer a detector output signal from a second row of the first column to the first additional column cell;

a second column cell for receiving a detector output signal from a first row of a second column in a second portion of the sensor array;

a second additional column cell;

a second multiplexer configured to steer a detector output signal from a second row of the second column to the second additional column cell;

a third multiplexer for multiplexing output of column cells associated with the first portion into a first serial data stream;

a first output driver for driving the first serial data stream;

a fourth multiplexer for multiplexing output of column cells associated with the second portion into a second serial data stream; and a second output driver for driving the second serial data stream;

wherein at least one of the first and second multiplexers allows columns of the subset to be readout at two or more speeds.

* * * * *